US012238399B2

(12) United States Patent
Ju

(10) Patent No.: US 12,238,399 B2
(45) Date of Patent: Feb. 25, 2025

(54) ELECTRONIC DEVICE INCLUDING CAMERA

(71) Applicant: SAMSUNG ELECTRONICS CO., LTD., Suwon-si (KR)

(72) Inventor: Wanjae Ju, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 22 days.

(21) Appl. No.: 17/717,306

(22) Filed: Apr. 11, 2022

(65) Prior Publication Data

US 2023/0010526 A1  Jan. 12, 2023

Related U.S. Application Data

(63) Continuation of application No. PCT/KR2022/003624, filed on Mar. 15, 2022.

(30) Foreign Application Priority Data

Jul. 8, 2021  (KR) ........................ 10-2021-0089496

(51) Int. Cl.
*H04N 23/56* (2023.01)
*G06F 1/16* (2006.01)
(Continued)

(52) U.S. Cl.
CPC ........... *H04N 23/56* (2023.01); *G06F 1/1686* (2013.01); *H04N 23/45* (2023.01); *H04N 23/55* (2023.01)

(58) Field of Classification Search
CPC .. G06F 1/1626; G06F 1/1686; H04M 1/0264; H04N 23/45; H04N 23/55; H04N 23/56;
(Continued)

(56) References Cited

U.S. PATENT DOCUMENTS

| 2017/0085761 A1 | 3/2017 | Shin |
| 2018/0100957 A1 | 4/2018 | Ye et al. |

(Continued)

FOREIGN PATENT DOCUMENTS

| CN | 110278332 | 9/2019 |
| CN | 111970394 | 11/2020 |

(Continued)

OTHER PUBLICATIONS

Search Report and Written Opinion issued Jun. 20, 2022 in counterpart International Patent Application No. PCT/KR2022/003624.
(Continued)

*Primary Examiner* — Antoinette T Spinks
(74) *Attorney, Agent, or Firm* — Nixon & Vanderhye, P.C.

(57) ABSTRACT

According to various embodiments, an electronic device may include: a housing, a plurality of cameras disposed on a surface of the housing, a light source disposed adjacent to at least one of the plurality of cameras on the surface of the housing, and a camera cover disposed on the housing, wherein the camera cover is disposed to cover at least a portion of the plurality of cameras and/or the light source. The camera cover may include a first light emitting area corresponding to the light source and configured to emit a part of light emitted from the light source to the outside, a first incident area corresponding to a first camera among the plurality of cameras and configured to allow and/or guide external light to be incident on the first camera, and at least one second light emitting area positioned closer to the first incident area than the first light emitting area, wherein the at least one second light emitting area is configured to emit another part of the light emitted from the light source to the outside.

16 Claims, 17 Drawing Sheets

(51) Int. Cl.
*H04N 23/45* (2023.01)
*H04N 23/55* (2023.01)

(58) Field of Classification Search
CPC ........ H04N 23/51; H04N 23/57; H04N 23/74; G03B 11/04
See application file for complete search history.

(56) References Cited

U.S. PATENT DOCUMENTS

| | | |
|---|---|---|
| 2018/0241861 A1 | 8/2018 | Kim et al. |
| 2019/0037062 A1 | 1/2019 | Aberle |
| 2020/0046235 A1 | 2/2020 | Jung et al. |
| 2021/0136187 A1 | 5/2021 | Jeon |
| 2022/0030142 A1 | 1/2022 | Jun |
| 2022/0159169 A1 | 5/2022 | Tang et al. |

FOREIGN PATENT DOCUMENTS

| | | |
|---|---|---|
| EP | 3 920 521 | 12/2021 |
| KR | 10-2008-0001322 | 1/2008 |
| KR | 10-2015-0026419 | 3/2015 |
| KR | 20150026419 A * | 3/2015 |
| KR | 10-2016-0116559 | 10/2016 |
| KR | 10-2018-0093628 | 8/2018 |
| KR | 10-2018-0096178 | 8/2018 |
| KR | 10-2019-0020474 | 3/2019 |
| KR | 10-2345118 | 12/2021 |
| KR | 10-2022-0010979 | 1/2022 |
| WO | 2020/192327 | 10/2020 |

OTHER PUBLICATIONS

Extended Search Report dated Sep. 20, 2024 in European Patent Application No. 22837785.9.

* cited by examiner

ELECTRONIC DEVICE INCLUDING CAMERA

CROSS-REFERENCE TO RELATED APPLICATIONS

This application is a continuation of International Application No. PCT/KR2022/003624 designating the United States, filed on Mar. 15, 2022, in the Korean Intellectual Property Receiving Office and claiming priority to Korean Patent Application No. 10-2021-0089496, filed on Jul. 8, 2021, in the Korean Intellectual Property Office, the disclosures of which are incorporated by reference herein in their entireties.

BACKGROUND

Field

The disclosure relates to an electronic device. For example, various embodiments relate to an electronic device including a camera.

Description of Related Art

As electronic, information, and communication technologies have developed, various functions have come to be integrated into a single electronic device. For example, a smartphone includes functions of an audio reproduction device, an imaging device, or a digital diary, in addition to a communication function, and a greater variety of functions may be implemented in the smartphone through installation of additional applications. An electronic device may be provided with various pieces of information in real time by accessing a server or another electronic device in a wired or wireless manner as well as by executing an installed application or a stored file.

As various functions are implemented in single electronic devices (e.g., smartphones), electronic devices such as sound playback devices performing a specific function have already been replaced by smartphones, and the areas of video playback devices or imaging devices are also gradually being replaced by smartphones. In a miniaturized electronic device, since optical performances may be limited, it is possible to enhance the quality of captured images or videos by implementing an imaging function using a plurality of cameras or a plurality of image sensors. For example, electronic devices such as smartphones are replacing compact cameras, and it is expected that the electronic devices may replace high-performance cameras such as single-lens reflex cameras in the future.

The above-described information may be provided as background for the purpose of helping understanding of the disclosure. No claim or determination is made as to whether any of the foregoing may be applied as prior art regarding the disclosure.

In a close-up shot mode, in which a subject within a distance of several tens of centimeters is imaged, there may be a large variation in illumination or illuminance. For example, when close-up shot is performed from a direction desired by the user, it may be difficult to obtain an image intended by the user due to the shadow of an imaging device (e.g., an electronic device such as a smartphone) or the user. By providing illumination such as a flash for imaging, it is possible to obtain a good subject image even in a dark environment. However, even when illumination is provided to a subject, it may be difficult to provide even illumination to the subject in a close-up shot mode due to the distance between the subject and the flash light source or the distance between the light source and the camera. By placing a larger number of light sources around the camera to evenly illuminate an area directed by the camera, it is possible to provide even illumination to a subject even in a close-up shot mode. However, in a miniaturized electronic device such as a smartphone, there may be a restriction in increasing the number of light sources for flash.

SUMMARY

Various embodiments disclosed herein are intended to address at least the above-described problems and/or disadvantages and provide at least the advantages to be described below, and are able to provide an electronic device that is compact and easy to provide illumination for a close-up shot.

Embodiments of the disclosure provide an electronic device capable of enhancing the quality of a close-up shot image.

According to various example embodiments disclosed herein, an electronic device may include: a housing, a plurality of cameras disposed on one surface of the housing, a light source disposed adjacent to at least one of the plurality of cameras on the one surface of the housing, and a camera cover disposed on the housing, wherein the camera cover is disposed to cover at least a portion of the plurality of cameras and/or the light source. The camera cover may include a first light emitting area corresponding to the light source and configured to emit a part of light emitted from the light source to the outside, a first incident area corresponding to a first camera among the plurality of cameras and configured to allow and/or guide external light to be incident on the first camera, and at least one second light emitting area positioned closer to the first incident area than the first light emitting area, wherein the at least one second light emitting area is configured to emit another part of the light emitted from the light source to the outside.

According to various example embodiments disclosed herein, an electronic device may include: a housing, a plurality of cameras disposed on one surface of the housing, a light source disposed adjacent to at least one of the plurality of cameras on the one surface of the housing, a camera cover disposed on the housing, wherein the camera cover is disposed to cover at least a portion of the plurality of cameras and/or the light source, and a processor. The camera cover may include a first light emitting area corresponding to the light source and configured to emit a part of light emitted from the light source the outside, a first incident area corresponding to a first camera among the plurality of cameras and configured to allow and/or guide external light to be incident on the first camera, and at least one second light emitting area positioned closer to the first incident area than the first light emitting area, wherein the at least one second light emitting area is configured to emit another part of the light emitted from the light source to the outside. The processor may be configured to: acquire a subject image using at least the first camera among the plurality of cameras while providing illumination to a subject by applying a first current to the light source, and to provide illumination to the subject by applying a second current greater than the first current to the light source while acquiring another subject image using at least one of the plurality of camera.

According to various example embodiments disclosed herein, it is possible to emit a part of light emitted from one light source to an area directed by the camera for a close-up shot in a close-up shot mode while providing a function of illumination for shot or a flashlight using a single light source. For example, the electronic device according to various example embodiments disclosed herein is capable of evenly providing illumination to a subject at a close distance in a close-up shot mode while providing illumination for a standard or wide-angle shot using a single light source. For example, since it is possible to provide illumination for a close-up shot, the electronic device is capable of improving the quality of a close-up shot image while being miniaturized. In addition, various effects recognized directly or indirectly through this disclosure may be provided.

BRIEF DESCRIPTION OF THE DRAWINGS

The above and other aspects, features, and/or advantages of certain embodiments of the present disclosure will be more apparent from the following detailed description, taken in conjunction with the accompanying drawings, in which.

Throughout the appended drawings, like reference numerals may be assigned to like parts, components, and/or structures.

DETAILED DESCRIPTION

The following description made with reference to the appended drawings may be provided to aid in understanding of various example embodiments of the disclosure. Embodiments disclosed in the following description may include various specific details to aid in understanding, but are considered to be example embodiments. Accordingly, it will be apparent to those skilled in the art that various changes and modifications of the various embodiments described herein can be made without departing from the scope and spirit of the disclosure. In addition, descriptions of well-known functions and configurations may be omitted for clarity and brevity.

The terms and words used in the following description and claims are not limited to a bibliographical meaning, but may be used to clearly and consistently describe the various embodiments disclosed herein. Therefore, it will be apparent to those skilled in the art that the following description of various embodiments of the disclosure is provided only for the purpose of explanation, not for the purpose of limiting the disclosure.

It should be understood that the singular forms of "a", "an", and "the" include plural meanings, unless the context clearly indicate otherwise. Thus, for example, "a component surface" may refer, for example to one or more of component surfaces.

Figure 1:
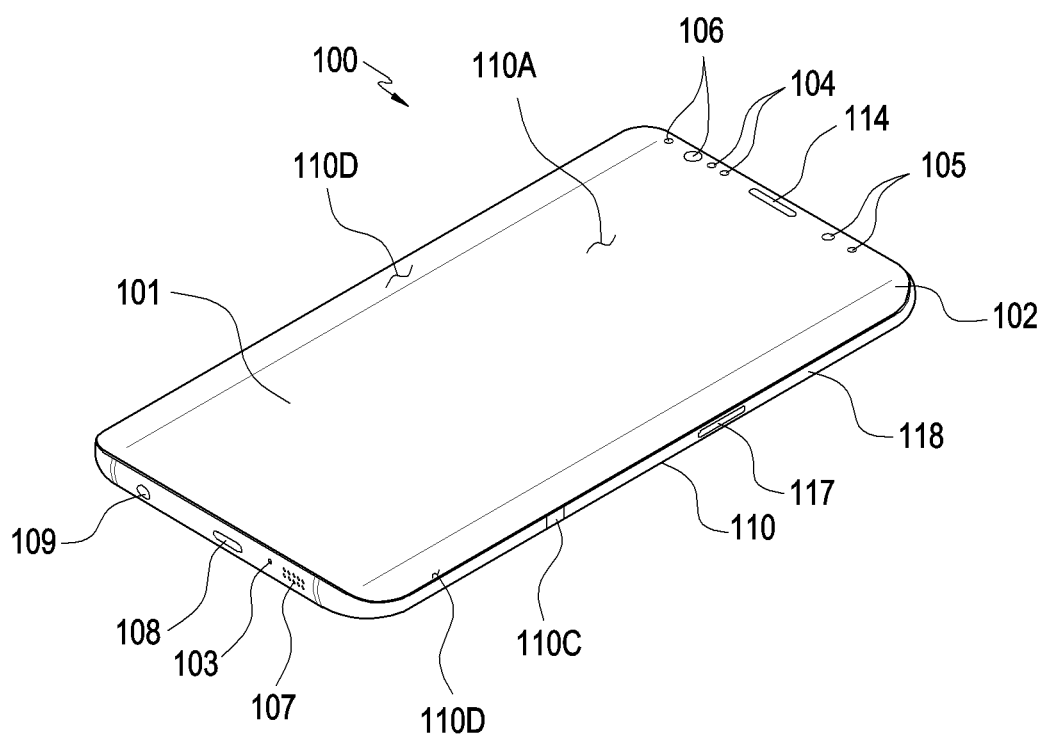
FIG. 1 is a front perspective view of an electronic device according to various embodiments.
Figure 2:
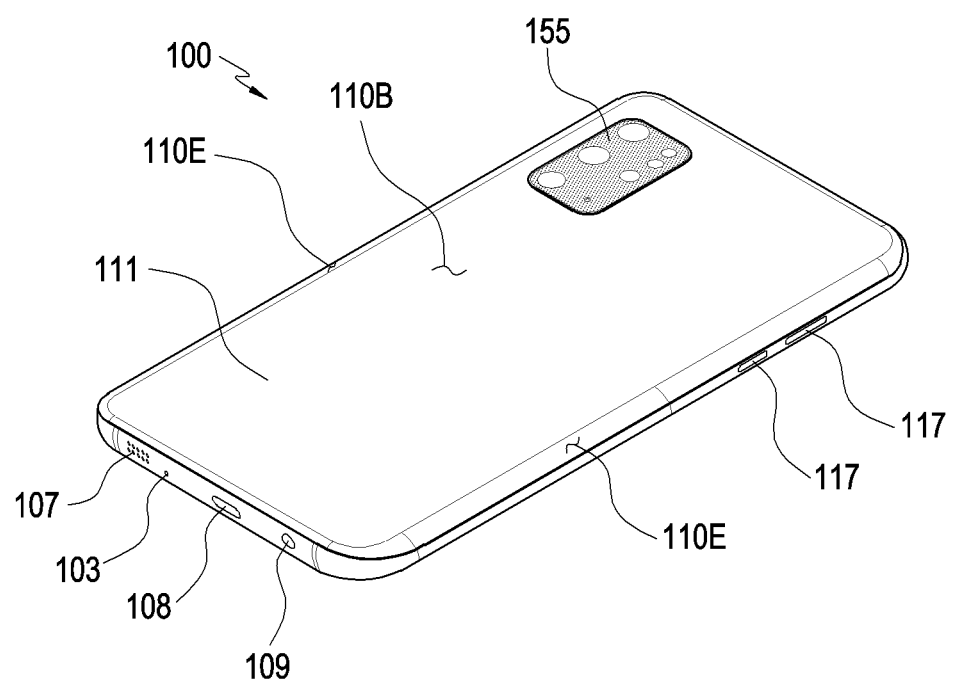
FIG. 2 is a rear perspective view of the electronic device according to various embodiments.

FIG. 1 is a front perspective view of an electronic device 100 according to various embodiments. FIG. 2 is a rear perspective view of the electronic device 100 according to various embodiments.

Referring to FIGS. 1 and 2, the electronic device 100 according to an embodiment may include a housing 110 including a first surface (or a front surface) 110A, a second surface (or a rear surface) 110B, and a side surface 110C surrounding the space between the first surface 110A and the second surface 110B. In an embodiment (not illustrated), the housing may be a structure defining some of the first surface 110A of FIG. 1, the second surface 110B, and the side surface 110C of FIG. 2. According to an embodiment, at least a portion of the first surface 110A may be provided by a substantially transparent front plate 102 (e.g., a glass plate or a polymer plate including various coating layers). In an embodiment, the front plate 102 may be coupled to the housing 110 so as to define an inner space with the housing 110. In various embodiments, the term "internal space" may be a space accommodating at least a portion of the display 101 as an internal space of the housing 110.

According to various embodiments, the second surface 110B may be defined by a substantially opaque rear plate 111. The rear plate 111 may be made of, for example, coated or colored glass, ceramic, polymer, metal (e.g., aluminum, stainless steel (STS), or magnesium), or a combination of two or more of these materials. The side surface 110C may be defined by a side bezel structure 118 (or a "side member") coupled to the front plate 102 and the rear plate 111 and including a metal and/or a polymer. In various embodiments, the rear plate 111 and the side bezel structure 118 may be integrally configured, and may include the same material (e.g., a metal material such as aluminum).

In the illustrated embodiment, the front plate 102 may include two first areas 110D (e.g., curved areas), which are bent from the first surface 110A toward the rear plate 111 and extend seamlessly, at the long opposite side edges thereof. In the illustrated embodiment, the rear plate 111 may include two second areas 110E (e.g., curved areas), which are bent from the second face 110B toward the front plate 102 and extend seamlessly, at the long opposite side edges thereof. In various embodiments, the front plate 102 (or the rear plate 111) may include only one of the first areas 110D (or the second areas 110E). In an embodiment, some of the first areas 110D or the second areas 110E may not be included. In the above embodiments, when viewed from a side of the electronic device 100, the side bezel structure 118 may have a first thickness (or width) on the side surface in which the first areas 110D or the second areas 110E are not included (e.g., the side surface in which the connector hole 108 is disposed), and may have a second thickness, which is smaller than the first thickness, on the side surface in which the first areas 110D or the second areas 110E are included (e.g., the side surfaces in which the key input devices 117 are disposed).

According to an embodiment, the electronic device 100 may include at least one of a display 101, audio modules 103, 107, and 114, sensor modules 104, camera modules 105 and 155, key input devices 117, light-emitting elements 106, and connector holes 108 and 109. In various embodiments, at least one of the components (e.g., the key input devices 117 or the light-emitting elements 106) may be omitted from the electronic device 100, or the electronic device 100 may additionally include other components.

The display 101 may be exposed through, for example, a considerable portion of the front plate 102. In various embodiments, at least a portion of the display 101 may be exposed through the front plate 102 forming the first surface 110A and the first areas 110D of the side surfaces 110C. In various embodiments, the edges of the display 101 may be formed to be substantially the same as the shape of the periphery of the front plate 102 adjacent thereto. In an embodiment (not illustrated), the distance between the periphery of the display 101 and the periphery of the front plate 102 may be substantially constant in order to enlarge the exposed area of the display 101.

In an embodiment (not illustrated), recesses or openings may be provided in a portion of a screen display area (e.g., an active area) or an area (e.g., a non-active area) out of the screen display area of the display 101, and at least one of the audio module 114, the sensor modules 104, the camera modules 105 and 155, and the light-emitting elements 106, which are aligned with the recesses or the openings, may be included. In an embodiment (not illustrated), the rear surface of the screen display area of the display 101 may include at least one of the audio module 114, the sensor modules 104, the camera modules 105 and 155, and the light-emitting elements 106. In an embodiment (not illustrated), the display 101 may be coupled to or disposed adjacent to a touch-sensitive circuit, a pressure sensor capable of measuring a touch intensity (pressure), and/or a digitizer configured to detect a magnetic field-type stylus pen. In various embodiments, at least some of the sensor modules 104 and/or at least some of the key input devices 117 may be disposed in the first areas 110D and/or the second areas 110E.

The audio modules 103, 107, and 114 may include a microphone hole 103 and speaker holes 107 and 114. The microphone hole 103 may include a microphone disposed therein so as to acquire external sound, and in various embodiments, multiple microphones may be disposed therein so as to detect the direction of sound. The speaker holes 107 and 114 may include an external speaker hole 107 and a phone call receiver hole 114. In various embodiments, the speaker holes 107 and 114 and the microphone hole 103 may be implemented as a single hole, or a speaker (e.g., a piezo speaker) may be included without the speaker holes 107 and 114.

The sensor module 104 may generate electrical signals or data values corresponding to the internal operating states or the external environmental states of the electronic device 100. The sensor modules 104 may include, for example, a first sensor module 104 (e.g., a proximity sensor), a second sensor module (not illustrated) (e.g., a fingerprint sensor) disposed on the first surface 110A of the housing 110, and/or another sensor module (not illustrated) (e.g., an HRM sensor or a fingerprint sensor) disposed on the second surface 110B of the housing 110. The fingerprint sensor may be disposed not only on the first surface 110A (e.g., the display 101) of the housing 110, but also on the second surface 110B. The electronic device 100 may further include at least one of sensor modules (not illustrated), such as a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor 104.

The camera modules 105 and 155 may include a first camera device 105 disposed on the first surface 110A of the electronic device 100 and a second camera device 155 disposed on the second surface 110B of the electronic device 100. The second camera device 155 may include, for example, an infrared light source, an infrared receiver, a flicker detection sensor, and/or a plurality of cameras. The camera modules 105 and 155 may include one or more lenses, an image sensor, and/or an image signal processor. A flash (not illustrated) may be disposed on the second surface 110B. The flash 113 may include, for example, a light-emitting diode or a xenon lamp. In various embodiments, two or more lenses (e.g., an infrared camera lens, a wide-angle lens, and a telephoto lens) and image sensors may be disposed on one surface of the electronic device 100.

The key input devices 117 may be arranged on the side surface 110C of the housing 110. In an embodiment, the electronic device 100 may not include some or all of the above-mentioned key input devices 117, and a key input device 117, which is not included therein, may be implemented in another form of a soft key or the like on the display 101.

The light-emitting elements 106 may be disposed, for example, on the first surface 110A of the housing 110. The light-emitting elements 106 may provide, for example, information about the state of the electronic device 100 in an optical form. In an embodiment, the light-emitting elements 106 may provide a light source that is interlocked with, for example, the operation of the camera modules 105. The light emitting elements 106 may include, for example, an LED, an IR LED, and a xenon lamp.

The connector holes 108 and 109 may include a first connector hole 108, which is capable of accommodating a connector (e.g., a USB connector) for transmitting/receiving power and/or data to/from an external electronic device, and/or a second connector hole 109, which is capable of accommodating a connector (e.g., an earphone jack) for transmitting/receiving an audio signal to/from an external electronic device.

Figure 3:
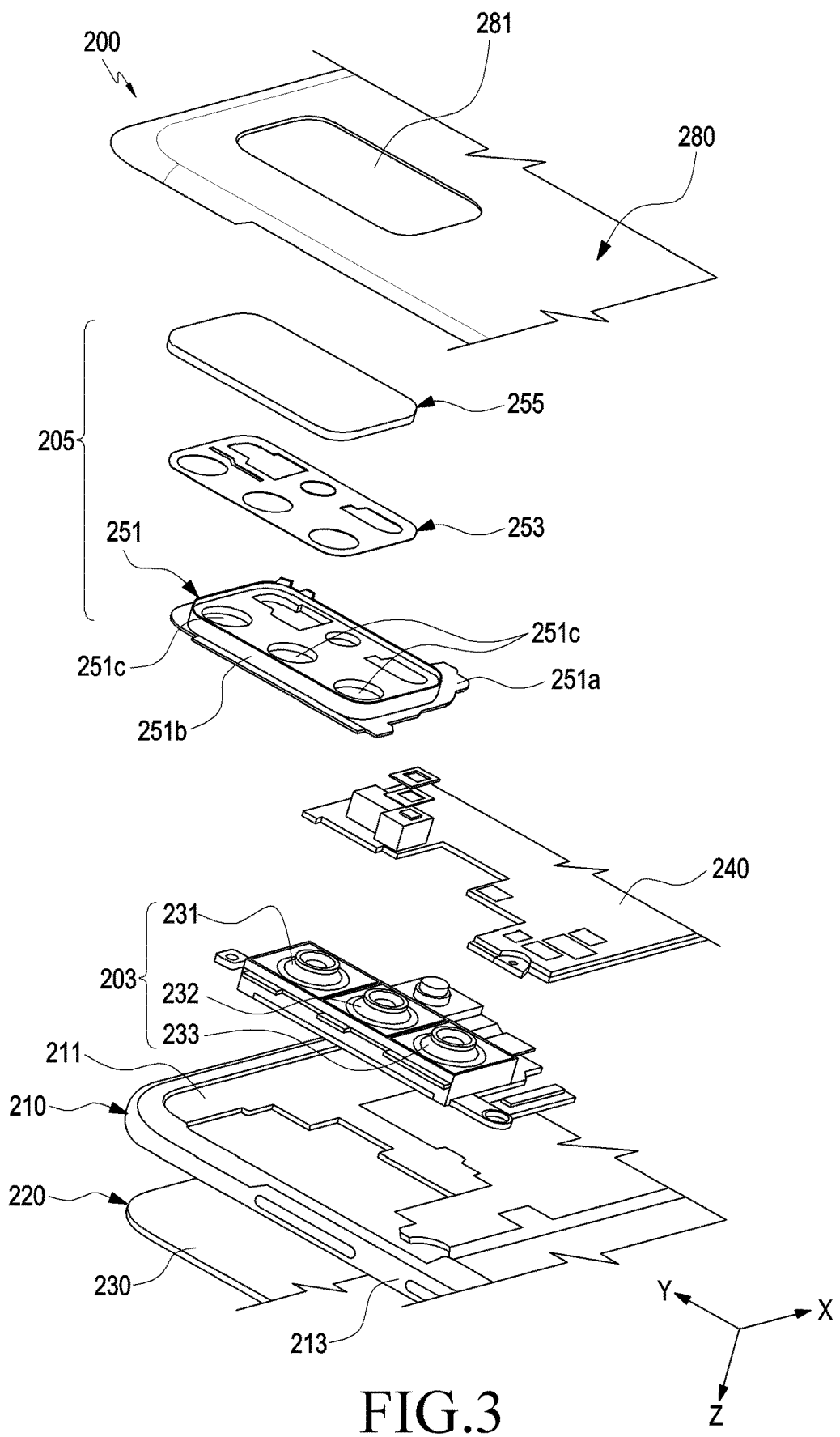
FIG. 3 is an exploded perspective view of an electronic device according to various embodiments.
Figure 4:
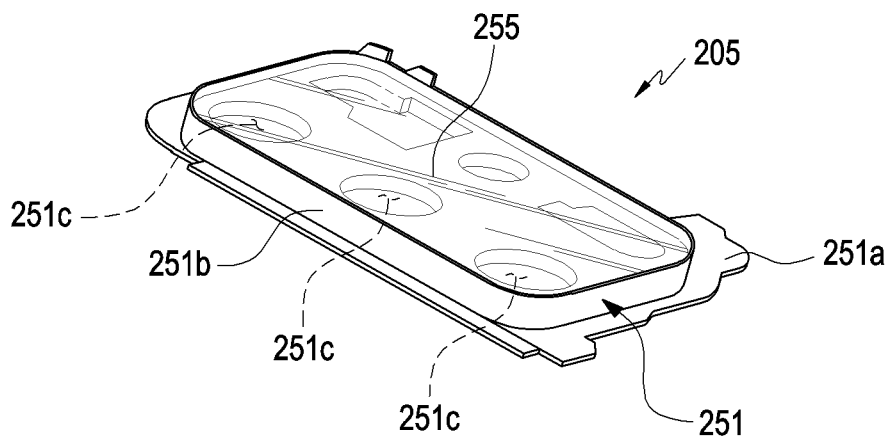
FIG. 4 is a perspective view illustrating an example window attached in an electronic device according to various embodiments.

FIG. 3 is an exploded perspective view illustrating a part of an electronic device 200 (e.g., the electronic device 100 in FIG. 1 or FIG. 2) according to various embodiments. FIG. 4 is a perspective view illustrating a window 255 attached to an electronic device (e.g., the electronic device 100 or 200 in FIGS. 1 to 3) according to various embodiments.

Referring to FIGS. 3 and 4, the electronic device 200 may include a housing 210, and the housing 210 (e.g., the housing 110 of FIG. 1) may include a front plate 220 (e.g., the front plate 102 in FIG. 1), a rear plate 280 (e.g., the rear plate 111 in FIG. 2), and a side structure 213 (e.g., the side surface 110C in FIG. 1) surrounding the space between the front plate 220 and the rear plate 280. In various embodiments, the housing 210 may include, in addition to the front plate 220, the rear plate 280, and the side structures 213, a component exposed to the exterior of the electronic device 200 or capable of being directly touched by the user (e.g., the camera window 255).

According to various embodiments, at least a portion of the front plate 220 may be substantially transparent, and may be formed of a glass plate or a polymer plate including various coating layers. The rear plate 280 may be formed of coated or tinted glass, ceramic, polymer, metal, or optional combination of the materials listed above and may be substantially opaque. The side structure 213 is coupled to the front plate 220 and the rear plate 280 and may include metal and/or polymer. In an embodiment, the side structure 213 may be integrally configured with the rear plate 280 and may be formed of the same material as the rear plate.

According to various embodiments, hardware or various electronic components such as a processor or a communication module may be accommodated inside the electronic device 200, and some hardware or electronic components may be visually or spatially exposed to the outside of the electronic device 200. For example, the display 230 (e.g., the display 101 in FIG. 1) may be disposed on the inner surface of the front plate 220 and accommodated inside the electronic device 200 (e.g., the housing 210) so that a significant portion of the front plate 220 may be visually exposed (e.g., visible) to the outside of the electronic device.

According to various embodiments, the electronic device 200 may include a support member (e.g., support) 211 connected to the side structure 213 and disposed inside the electronic device 200. The support member 211 may be formed of a metal material and/or a non-metal material, and may be configured integrally with the side structure 213. The display 230 may be coupled to one surface of the support member 211, and a printed circuit board 240 may be disposed on the other surface of the support member 211. On the printed circuit board 240, a processor, a memory, and/or an interface may be mounted. Although not illustrated, the electronic device 200 may further include a second support member disposed between the printed circuit board 240 and the rear plate 280. For example, the printed circuit board 240 may be disposed in a space between the support member 211 and the second support member (not illustrated). When the second support member is provided, the rear plate 280 may be coupled to the second support member. A configuration in which the rear plate 280 is coupled to the support member 211 may be mentioned in an embodiment to be described in greater detail below, and may be different from the structure illustrated in FIG. 3. However, it may be understood that the electronic device 200 has a configuration further including the second support member.

According to various embodiments, the electronic device 200 may include a camera assembly 203 including a plurality of cameras 231, 232, and 233, and although reference numbers are not assigned, the electronic device may further include disposed an infrared light source, an infrared receiver, and/or a flicker detection sensor adjacent to the camera assembly 203. The camera assembly 203 may include a first camera 231, a second camera 232, and/or a third camera 233 arranged along the longitudinal direction Y of the electronic device 200, and may be disposed on one surface (e.g., the rear surface) of the housing 210 to be directed to a subject. In an embodiment, the camera assembly 203 or cameras 231, 232, and 233 may be electrically connected to a printed circuit board 240 via a flexible printed circuit board and/or a connector. The electronic device 200 may generate or detect distance information about a subject using the infrared light source and the infrared receiver, and the flicker detection sensor may provide information necessary to remove distortion or defects in image data by detecting flicker of artificial illumination.

According to various embodiments, the camera assembly 203 may include optical component(s) for receiving or outputting light while being disposed inside the housing 210, and may be disposed at a position corresponding to an opening area 281 in the rear plate 280. In various embodiments, the infrared light source, the infrared receiver, and/or the flicker detection sensor may be disposed at the position corresponding to the opening area 281 together with the camera assembly 203. According to an embodiment, the electronic device 200 may include a camera decoration 205 (e.g., a window frame 251, a dummy plate 253, and/or a window 255) that provides an imaging path of the camera assembly 203 while closing the opening area 281. In various embodiments, the camera decoration 205 may be referred to herein as a "camera cover", a "decorative member", and/or a "protective member", and may be disposed on the housing to protect the camera assembly 203 from the external environment and to impart a decorative effect in the external appearance of the electronic device 200. In an embodiment, the camera decoration 205 (e.g., the window frame 251 and/or the window 255) may be a part of the housing 210.

According to various embodiments, the window frame 251 may be made of a synthetic resin or a metal material, and may be disposed on the inner surface of the rear plate 280 (or the support member 211) to close the opening area 281. In various embodiments, the window frame 251 may be provided as a part of a second support member (not illustrated) provided between the printed circuit board 240 and the rear plate 280. According to an embodiment, the window frame 251 may provide one or more openings 251c corresponding to the cameras 231, 232, and 233, the infrared light source, the infrared receiver, and/or the flicker detection sensor. The opening(s) 251c may be positioned substantially on the opening are 281, thereby being visually exposed to the outside of the housing 210 (e.g., the rear plate 280). In various embodiments, the window frame 251 may include a plurality of openings 251c that correspond to the cameras 231, 232, 233, the infrared light source, the infrared receiver, and the flicker detection sensor, respectively, and in an embodiment, the window frame 251 may include one opening 251c. When the window frame 251 includes one opening 251c, the cameras 231, 232, and 233, the infrared light source, the infrared receiver, and/or the flicker detection sensor may receive external light or transmit optical signals to the outside through different areas in the one opening 251c.

According to various embodiments, the window frame 251 may include a base plate 251a and a protrusion 251b. In various embodiments, the base plate 251a may be a flange extending in the X-axis direction or the Y-axis direction from the outer surface of the protrusion 251b. According to an embodiment, the protrusion 251b may protrude from one surface of the base plate 251a and may be configured to surround at least a portion of the opening 251c. In the illustrated embodiment, the protrusion 251b may be disposed on the base plate 251a to be oriented in the −Z-axis direction.

According to various embodiments, in the structure in which a plurality of openings 251c are provided, the openings 251c may be disposed in the area surrounded by the protrusion 251b. In an embodiment, the protrusion 251b may be adapted to define or surround one opening 251c. For example, the opening(s) 251c may be configured through the window frame 251 and/or the base plate 251a in the area surrounded by the protrusion 251b. In an embodiment, when the base plate 251a is disposed on the rear plate 280 or the support member 211, the protrusion 251b may be disposed at least partially in the opening area 281 of the rear plate 280. For example, the protrusion 251b or the opening(s) 251c may be substantially exposed to the external space of the electronic device 200 or the housing 210.

According to various embodiments, the window 255 may be coupled to the window frame 251. In an embodiment, the window 255 may be disposed to be substantially surrounded by the protrusion 251b to close the opening(s) 251c, and may be made of a substantially transparent material, such as a glass plate or a polymer plate, to allow light to pass therethrough. For example, the window 255 may close the opening(s) 251c may provide optical paths for the cameras 231, 232, and 233, the infrared light source, the infrared receiver, and/or the flicker detection sensor while isolating the internal space of the housing 210 from the external space.

According to various embodiments, the electronic device 200 may further include a dummy plate 253 provided between the window frame 251 and the window 255. The dummy plate 253 may function as a bonding member for attaching the window 255 to the window frame 251. In an embodiment, the dummy plate 253 may provide a decorative effect on the external appearance of the window 255 by including a decorative film, a vapor deposition layer, a plating layer, a printed layer, and/or a painting layer disposed or provided in a predetermined area on the inner surface of the window 255. For example, according to an embodiment, at least a portion of the dummy plate 253 may be a portion of the window 255, and an area corresponding to the opening(s) 251c may allow substantially light to pass therethrough.

Figure 5:
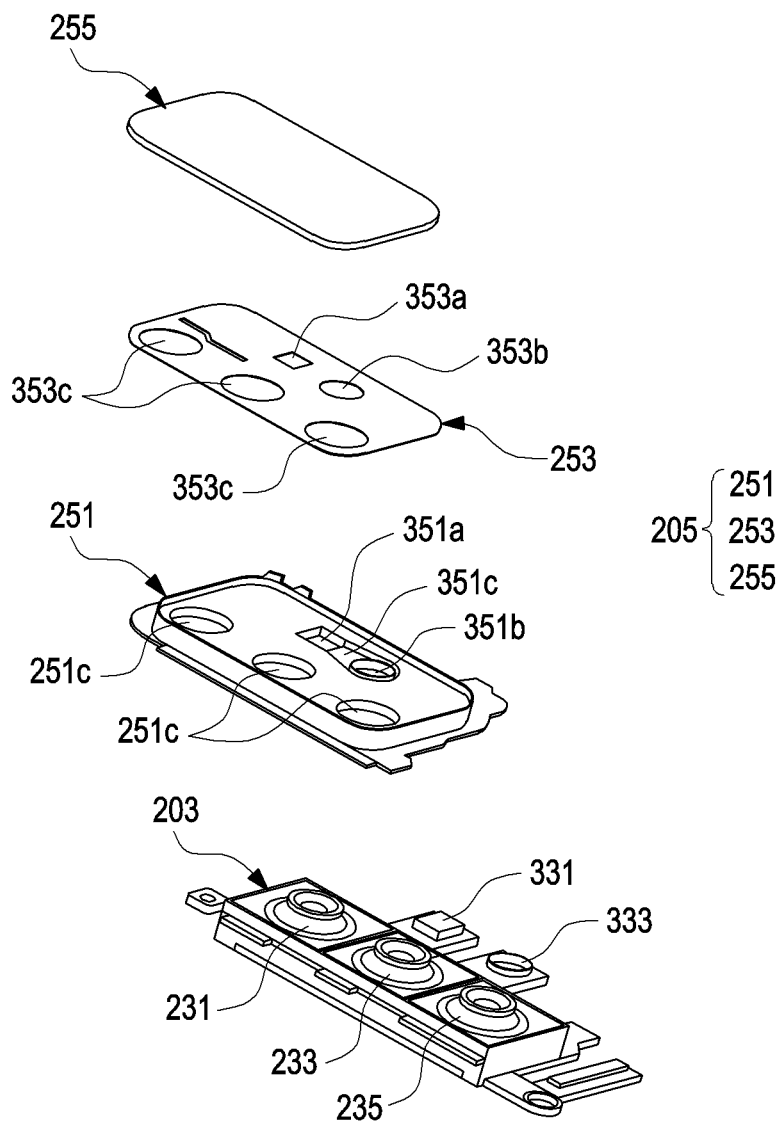
FIG. 5 is an exploded perspective view of a portion of an electronic device for providing illumination for a close-up shot according to various embodiments.

FIG. 5 is an exploded perspective view of the electronic device providing illumination for a close-up shot in an electronic device (e.g., the electronic device 100 or 200 of FIGS. 1 to 3 or the electronic device 1001, 1002, or 1004 in FIG. 23) according to various embodiments.

Figure 6:
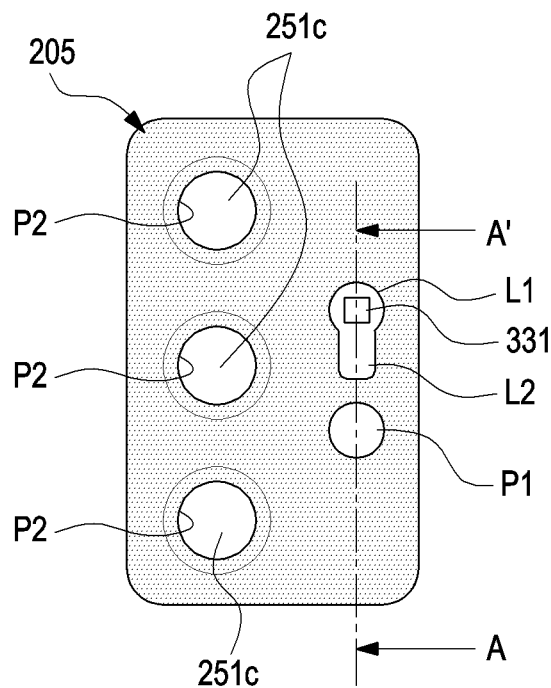
FIG. 6 is a diagram illustrating a portion of an electronic device according to various embodiments.
Figure 9:
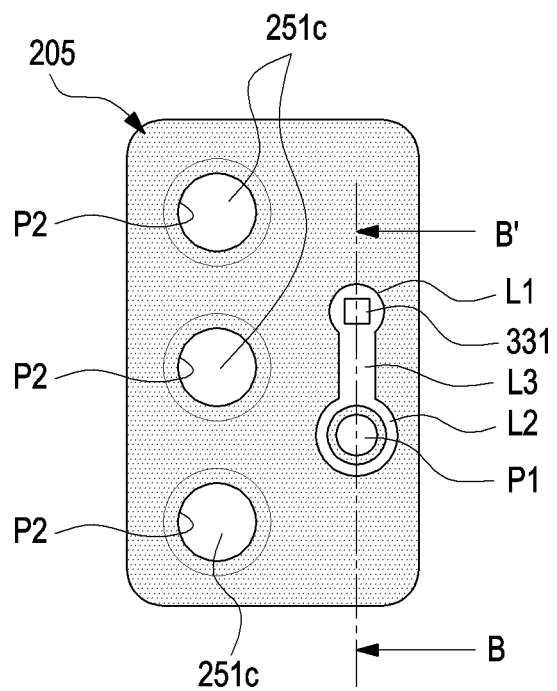
FIG. 9 is a diagram illustrating a portion of an electronic device according to various embodiments.

Referring to FIG. 5, the electronic device 200 may include a plurality of cameras 231, 233, 235, and 333, a light source 331, and a camera decoration 205, and the camera decoration 205 may be configured to emit light emitted from the light source 331 to the outside through at least two different areas (e.g., the first light emitting area L1 and the second light emitting area L2 in FIG. 6 or FIG. 9). According to an embodiment, the plurality of cameras 231, 233, 235, and 333 may include a first camera 333 for a close-up shot, and one or more second cameras 231, 233, and 235 for standard, wide-angle, or telephoto shot (hereinafter, "normal shot"). In an embodiment, the camera decoration 205 may provide a part of the light emitted from the light source 331 as illumination for standard, wide-angle, or telephoto shot through a first light emitting area (e.g., the first light emitting area L1 in FIG. 6 or FIG. 9), and may provide another part (or the rest) of the light emitted from the light source as illumination for a close-up shot through a second light emitting area (e.g., the second light emitting area L2 in FIG. 6 or FIG. 9). For example, the electronic device 200 and/or the camera decoration 205 may provide illumination for a close-up shot as well as normal shot using the light emitted from a single light source 331.

According to various embodiments, the plurality of cameras 231, 233, 235, and 333 may have different specifications such as a focal length or an angle of view, and may be disposed on one surface of the housing 210. In an embodiment, a camera for a close-up shot (e.g., the first camera 333) and a camera(s) for standard, wide-angle, or telephoto (e.g., normal shot) (e.g., the second cameras 231, 233, and 235) may be included. In various embodiments, at least one of the second cameras 231, 233, 235 may be used for a close-up shot together with the first camera 333, and similarly, two or more cameras selected from the plurality of cameras 231, 233, 235, and 333 may be set to be combined so as to acquire subject images in different shot modes. For convenience of description, the plurality of cameras 231, 233, 235, and 333 have been separately described to as being used for a close-up shot, standard shot, wide-angle shot, and telephoto shot, respectively, but this description may not limit the various embodiments disclosed herein. For example, in the present embodiment, the first camera 333 may be a camera capable of acquiring a higher magnification image than the other cameras (e.g., the second cameras 231, 233, and 235) and may be more suitable for a close-up shot than the second cameras 231, 233, and 235, and may be set as a camera for normal shot when combined with a camera having a different specification from the second cameras 231, 233, and 235.

According to various embodiments, the light source 331 may include an LED or a xenon lamp disposed adjacent to at least one of the plurality of cameras 231, 233, and 235 (e.g., the first camera 333), and depending on the strength of a current applied thereto, it is possible to provide illumination for a close-up shot, illumination for normal shot, or illumination for a flashlight. In an embodiment, a processor (e.g., the processor 1020 in FIG. 23) of the electronic device 200 may adjust the intensity of the current applied to the light source 331. For example, in a close-up shot mode in which illumination is provided within a short distance and a narrow area compared to other operating modes, the processor may operate the light source by applying a current lower than those in the other operating modes. In providing illumination for normal shot or illumination for a flashlight, the processor may operate the light source by applying a current higher than that in the close-up shot mode. According to an embodiment, the intensity of the current applied to the light source 331 may vary depending on the ambient illuminance in the close-up shot mode, and the intensity of the current applied to the light source 331 may vary even when providing illumination for the flashlight. In an embodiment, the intensity of the maximum current applied to the light source 331 in the close-up shot mode may be equal to or higher than the intensity of the minimum current applied to provide illumination for the flashlight. In general, the higher the intensity of the current applied to the light source, the farther the light can be provided over a wider area. Table 1 below illustrates example intensities of currents applied to the light source 331, and the intensities of currents illustrated in Table 1 may be appropriately changed depending on the specification of the light source 331.

TABLE 1

| | $1^{st}$ stage current | $2^{nd}$ stage current | $3^{rd}$ stage current | $4^{th}$ stage current | $5^{th}$ stage current |
|---|---|---|---|---|---|
| Flashlight mode | 50 mA | 75 mA | 100 mA | 125 mA | 150 mA |
| Close-up shot mode | 10 mA | 20 mA | 30 mA | 40 mA | 50 mA |

According to various embodiments, the plurality of second cameras 231, 233, and 235 may be arranged in a first direction (e.g., the Y-axis direction in FIG. 3), and the light source 331 and the first camera 333 may be arranged in the first direction while being adjacent to the second cameras 231, 233, and 235. In various embodiments, the light source 331 may be disposed closer to the first camera 333 than to the second cameras 231, 233, and 235. In an embodiment, a camera (e.g., the first camera 333) disposed adjacent to the light source 331 may be set for a close-up shot.

According to various embodiments, when performing shot while providing illumination to a close subject within several tens of centimeters, the greater the distance between the light source 331 and the camera for a close-up shot (e.g., the first camera 333), a partial brightness deviation in the acquired image may become large. For example, the closer the distance to the subject, the relative angle between the direction in which the first camera 333 is oriented and the direction in which the light source 331 emits light may become large, which may cause a partial brightness deviation in the acquired image. In an embodiment, when a camera for a close-up shot is included in the plurality of cameras 231, 233, 235, and 333, the camera for a close-up shot may be disposed closest to the light source 331. In various embodiments, the camera decoration 205 may cause a part of the light emitted from the light source 331 to be emitted to the outside at a position or area closer to the camera for a close-up shot (e.g., the first camera 333), whereby it is possible to improve the partial brightness deviation in the image acquired through close-up shot.

According to various embodiments, the camera decoration 205 may include a window frame 251 and/or a window 255. According to an embodiment, the camera decoration 205 may further include a dummy plate 253. The dummy plate 253 may attach the window 255 to the window frame 251, and may determine the color or the like of the camera decoration 205 seen from the exterior. For example, the dummy plate 253 may include a printed layer, a coating layer, a painting layer, a deposition layer, a plating layer, and/or an adhesive layer. In various embodiments, the dummy plate 253 may be provided directly on the inner surface of the window 255. As described above, the window frame 251 may be a portion of a support member (e.g., the support member 211 in FIG. 3 or a second support member (not illustrated)), and the window 255 is a portion of the rear plate 280 in FIG. 3.

According to various embodiments, the window frame 251 may include a plurality of openings 251c, 351a, and 351b corresponding to the plurality of cameras 231, 233, 235, and 333 and/or the light source 331. In an embodiment, among the plurality of openings 251c, 351a, and 351b, the first opening 351a may be positioned to correspond to the light source 331 to emit at least a part of the light emitted from the light source 331, to the outside. In various embodiments, the dummy plate 253 includes a first transmissive area 353a corresponding to the first opening 351a, so that light emitted from the light source 331 may be emitted to the outside through the first transmissive area 353a and/or the window 255. In an embodiment, among the plurality of openings 251c, 351a, and 351b, the second opening 351b may be positioned to correspond to the first camera 333 to guide or allow external light to be incident on the first camera 333. For example, the first camera 333 may acquire a subject image by detecting light incident through the second opening 351b. The dummy plate 253 may guide or allow light to be incident on the first camera 333 from the outside by including the second transmissive area 353b corresponding to the second opening 351b. In an embodiment, among the plurality of openings 251c, 351a, and 351b, the third opening 251c may be positioned to correspond to any one of the second cameras 231, 233, and 235 to guide or allow external light to be incident on the second camera 231, 233, and 235. For example, the second cameras 231, 233, and 235 may acquire a subject image by detecting light incident through any one of the third openings 251c. The dummy plate 253 may allow or guide light to be incident on the second cameras 231, 233, and 235 from the outside by including a third transmissive area 353c corresponding to the third opening 251c.

According to various embodiments, the window frame 251 may include a light guide groove 351c provided on one surface. The light guide groove 351c may extend from, for example, the first opening 351a and may be configured to at least partially surround the perimeter of the second opening 351b. In various embodiments, the dummy plate 253 may conceal a portion of the light guide groove 351c and may visually expose another portion of the light guide groove 351c to the outside. For example, a portion of the light guide groove 351c that surrounds the perimeter of the second opening 351b may be substantially visually exposed to the outside of the window 255.

According to various embodiments, the inner wall of the first opening 351a, the bottom or inner wall of the light guide groove 351c, and/or a portion of the dummy plate 253 concealing a portion of the light guide groove reflects, refracts, and/or scatters light. For example, a part of the light emitted from the light source 331 may be guided to the light guide groove 351c while being reflected, refracted, and/or scattered by the inner wall of the first opening 351a, and may be emitted to the outside from the perimeter of the second opening 351b. In various embodiments, in order to guide a part of the light emitted from the light source 331 to be emitted from the perimeter of the second opening 351b, the electronic device 200 and/or the camera decoration 205 may further include a light guide member (e.g., the light guide member 361 or 461 of FIG. 8 or FIG. 11). As will be described in greater detail below, the light guide member may emit a part of the light emitted from the light source 331 to the outside through the first transmissive area 353a or may guide another part of the emitted light to be emitted to the outside near the second opening 351b by including a lens or a refractive pattern (e.g., the curved surfaces CS1 and CS2 in FIGS. 16 and 17 or the refractive pattern 761a in FIG. 18).

According to various embodiments, the electronic device 200 or the processor (e.g., the processor 1020 in FIG. 23 or the image signal processor 1160 in FIG. 24) may be configured to acquire a subject image using at least one of the plurality of cameras 231, 233, 235, and 333. In various embodiments, when the ambient illuminance is low, the electronic device 200 or the processor may be configured to acquire a subject image using at least one of the plurality of cameras 231, 233, 235, and 333 while providing illumination to the subject by applying a current to the light source 331. According to an embodiment, the first camera 333 disposed adjacent to the light source 331 may have a specification capable of acquiring a higher magnification image than the other cameras 231, 233, and 235, and the electronic device 200 or the processor may perform close-up shot using at least the first camera 333 among the plurality of cameras 231, 233, 235, and 333. In an embodiment, the electronic device 200 or the processor may be configured to provide illumination to the subject by applying a first current to the light source 331 in the close-up shot mode, and a current greater than the first current may be applied to the light source 331 in the normal shot mode or the flashlight mode.

In the following detailed description, the components, which can be easily understood through the above-described embodiments, may be denoted by the same reference numerals as the above-described embodiments or the reference numerals may be omitted, and the detailed description thereof may also be omitted.

Figure 7:
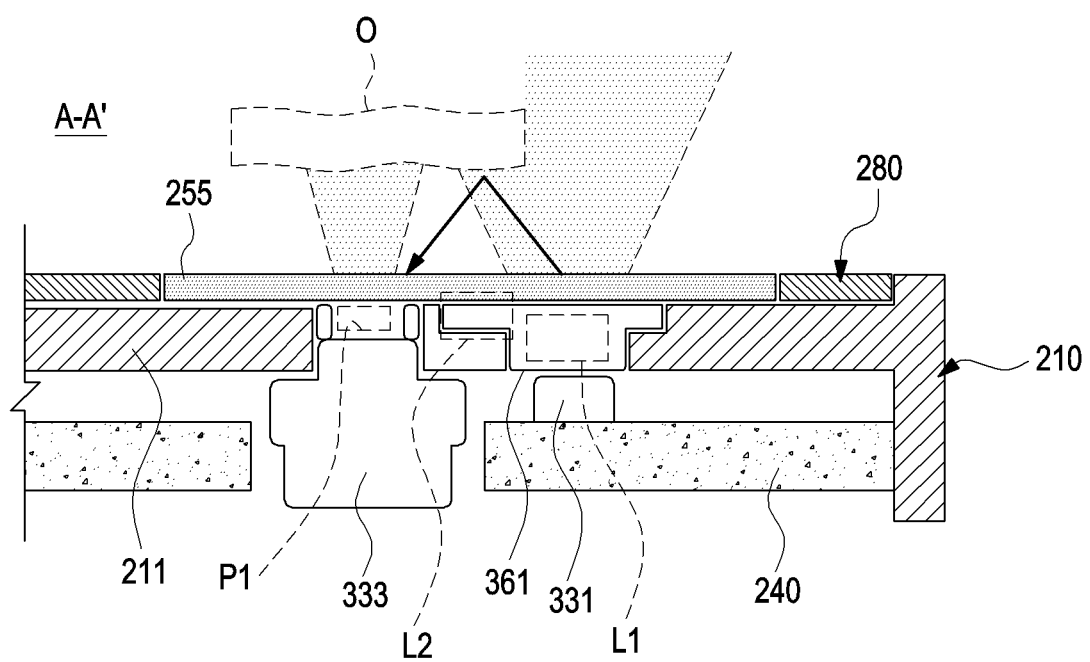
FIG. 7 is a cross-sectional view of the electronic device, taken along line A-A' of FIG. 6, according to various embodiments.
Figure 8:
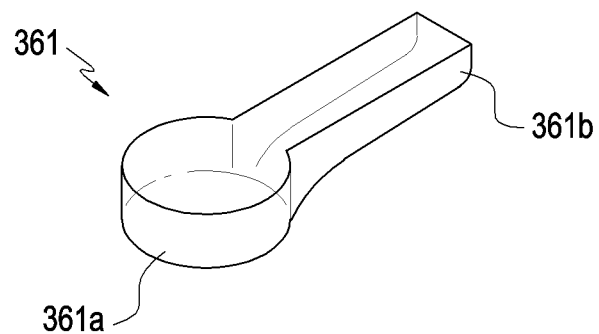
FIG. 8 is a perspective view of a light guide member of an electronic device according to various embodiments.

FIG. 6 is a diagram illustrating a portion (e.g., a portion in which the camera decoration 205 is disposed) of an electronic device (e.g., the electronic device 100 or 200 in FIGS. 1 to 3 or the electronic device 1001, 1002, or 1004 of FIG. 23) according to various embodiments. FIG. 7 is a cross-sectional view illustrating an electronic device 200, taken along line A-A' in FIG. 6 according to various embodiments. FIG. 8 is a perspective view illustrating a light guide member 361 of the electronic device 200 according to various embodiments.

Referring to FIGS. 6, 7 and 8 (which may be referred to as FIGS. 6 to 8), the electronic device 200 and/or the camera decoration 205 may further include a first light emitting area L1, a second light emitting area L2, a first incident area P1, a second light incident area(s) P2, and/or a light guide member 361. In the present embodiment, the "emitting area(s) L1 and L2" or "incident area(s) P1 and P2" are areas identified by the user with naked eye when looking at the camera decoration 205 from the outside of the electronic device 200 and are described as being distinguished from each other, and may be areas substantially overlapping the light source 331 or the plurality of cameras 231, 233, 235, and 333. In various embodiments, the "exit area(s) L1 and L2" or the "incident area(s) P1 and P2" may be substantially defined by transmissive areas (e.g., the transmissive areas 353*a*, 353*b*, and 353*c* in FIG. 5) provided in the dummy plate 253.

According to various embodiments, the first light emitting area L1 may be positioned to substantially correspond to the light source 331 to emit a part of the light emitted from the light source 331, to the outside. Further referring to FIG. 5, the first transmissive area 353*a* and the first opening 351*a* may be positioned to correspond to the first light emitting area L1 together with the light source 331. The second light emitting area L2 may be disposed closer to the first incident area P1 than the first light emitting area L1 and may be an area corresponding to a portion of the light guide groove 351*c* in FIG. 5. According to an embodiment, the second light emitting area L2 is an area extending from the first light emitting area L1 toward the first incident area P1, and another part of the light emitted from the light source 331 may be emitted to the outside through the second light emitting area L2 while being reflected, refracted, and/or scattered inside the first opening 351*a*. For example, the second light emitting area L2 may be at least partially disposed between the first light emitting area L1 and the first incident area P1, and may provide illumination to a subject O from a position closer to the first incident area P1 than the first light emitting area L1. In various embodiments, when the second light emitting area L2 is disposed between the first light emitting area L1 and the first incident area P1, or when the second light emitting area L2 has a shape extending from the first light emitting area L1 to the first incident area P1, the dummy plate may define the second light emitting area by including an additional transmissive area extending toward the second transmissive area from the first transmissive area.

According to various embodiments, the light emitted from the light source 331 may be used for substantially providing illumination to a subject O or utilized for a flashlight in normal shot, and may provide illumination to a subject O directed by the first camera 333 in the close-up shot mode by being partially emitted through the second light emitting area L2. As described above, in the close-up shot mode, the smaller the distance between the light source 331 and the first camera 333, the partial brightness deviation in an acquired image may be small. For example, when performing close-up shot while providing illumination to the subject O in the second light emitting area L2 close to the first incident area P1, the quality of the image acquired through the first camera 333 can be improved.

According to various embodiments, the incident area(s) P1 and P2 may be positioned to correspond to any one of the plurality of cameras (e.g., the cameras 231, 233, 235, and 333 in FIG. 5), so that it is possible to allow light to be incident on the plurality of cameras 231, 233, 235 and 333 from the outside. Further referring to FIG. 5, the second transmissive area 353*b* may be positioned such that the second opening 351*b* corresponds to the first incident area P1 among the incident areas P1 and P2 together with the first camera 333. Among the incident areas P1 and P2, the second incident areas P2 are areas corresponding to any one of the third transmissive area 353*c*, the third opening(s) 251*c*, and/or the second cameras 231, 233, and 235, and may be substantially defined by the third transmissive area 353*c*.

According to various embodiments, a part of the light emitted from the light source 331 may be emitted to the outside from the second light emitting area L2 through the light guide groove (e.g., the light guide groove 351*c* in FIG. 5). In various embodiments, the light guide groove 351*c* may guide light to the second emitting area L2 by reflecting, refracting, and/or scattering the light. In an embodiment, the electronic device 200 and/or the camera decoration 205 may further include a light guide member 361, and the light guide member 361 may guide a part of the light emitted from the light source 331 to the second light emitting area L2 by reflecting, refracting, and scattering the part of the light emitted from the light source 331.

According to various embodiments, the light guide member 361 may be at least partially disposed between the window frame 251 and the window 255. For example, the light guide member 361 may include a first guide portion 361*a* disposed to correspond to the first light emitting area L1 and a second guide portion 361*b* disposed to correspond to the second light emitting area L2. In various embodiments, the first guide portion 361*a* may be substantially accommodated in the first opening 351*a*, and the second guide portion 361b may be disposed in the light guide groove 351c of FIG. 5 while extending from the first guide portion 361a. According to an embodiment, the light guide member 361 may guide a part of the light emitted from the light source 331 to the second light emitting area L2 by including a lens structure or a refraction pattern (e.g., the curved surfaces CS1 and CS2 in FIGS. 16 and 17 or the refraction pattern 761a in FIG. 18) provided in the first guide portion 361a. When the light guide member 361 is disposed, the reflection structure, refraction structure, and/or scattering structure of the first opening 351a or the light guide groove 351c may be provided in the light guide member 361.

Figure 10:
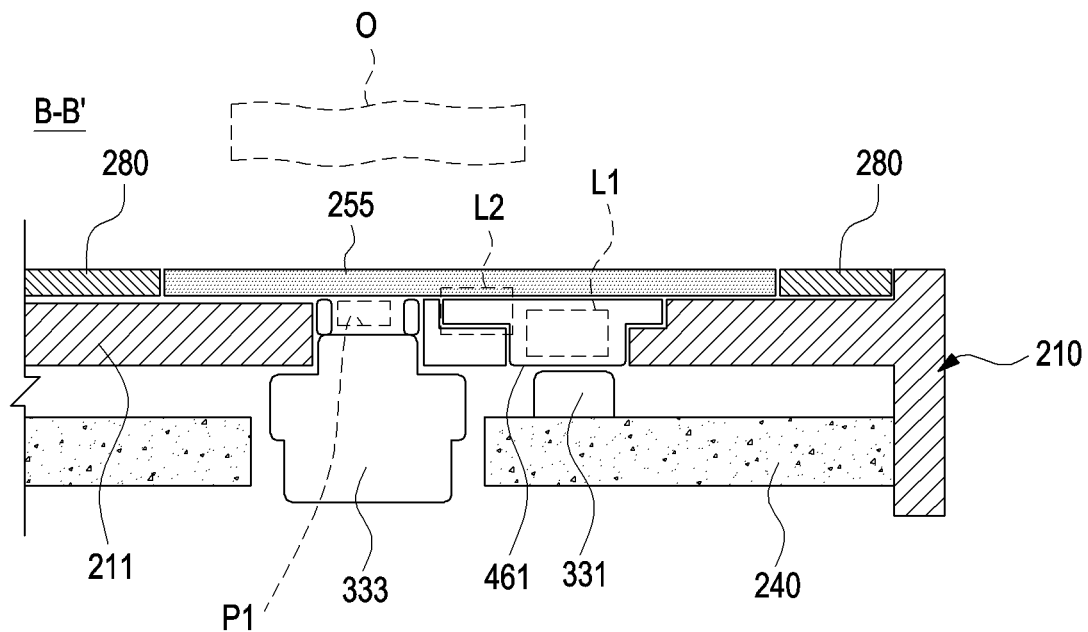
FIG. 10 is a cross-sectional view illustrating the electronic device, taken along line B-B' of FIG. 9, according to various embodiments.
Figure 11:
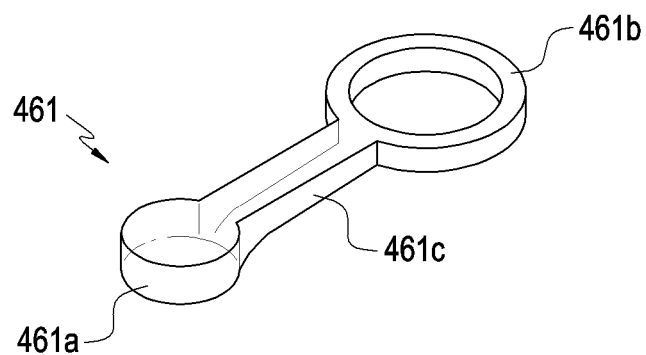
FIG. 11 is a perspective view of a light guide member of an electronic device according to various embodiments.

FIG. 9 is a diagram illustrating a portion (e.g., a portion in which the camera decoration 205 is disposed) of an electronic device (e.g., the electronic device 100 or 200 in FIGS. 1 to 3 or the electronic device 1001, 1002, or 1004 of FIG. 23) according to various embodiments. FIG. 10 is a cross-sectional view of the electronic device 200, taken along line B-B' in FIG. 9 according to various embodiments. FIG. 11 is a perspective view illustrating a light guide member 461 of an electronic device 200 according to various embodiments.

Referring to FIGS. 9, 10 and 11 (which may be referred to as FIGS. 9 to 11), the second light emitting area L2 is disposed around the first incident area P1, and the camera decoration 205 may further include a transfer area L3 between the first light emitting area L1 and the second light emitting area L2. In an embodiment, the transfer area L3 may be a portion of the light guide groove 351c of FIG. 5 or an area in which the third guide portion 461c of FIG. 11 is disposed. In the illustrated embodiment, the configuration in which the transfer area L3 is visually exposed from the outside of the camera decoration 205 is illustrated, but the various embodiments disclosed herein are not limited thereto. The transfer area L3 may be visually concealed by the dummy plate 253 and/or the window 255. If not visually concealed, the transfer area L3 may function as an additional light emitting area different from the first light emitting area L1 or the second light emitting area L2.

According to various embodiments, the second light emitting area L2 may form a closed curve surrounding the first incident area P1, and according to an embodiment, a plurality of second light emitting areas L2 may be arranged along the closed curve trajectory (see FIG. 20) around the first incident area P1. In various embodiments, when the second light emitting area L2 is disposed around the first incident area P1, it is possible to provide even illumination to a subject O in close-up shot than in the structure of FIG. 6. For example, when the second light emitting area L2 is disposed around the first incident area P1, the direction in which illumination is provided and the direction in which the first camera 333 is oriented may substantially coincide with each other.

According to various embodiments, the electronic device 200 and/or the camera decoration 205 may further include a light guide member 461 disposed at least partially between the window frame 251 and the window 255. The light guide member 461 is partially disposed in the first opening (e.g., the first opening 351a in FIG. 5), and the other portion may be disposed in the light guide groove (e.g., the light guide groove 351c in FIG. 5). According to an embodiment, the light guide member 461 may include a first guide portion 461a disposed in the first light-emitting area L1 (e.g., the first opening 351a), a second guide portion 461b disposed around the first incident area P1 (e.g., the second light-emitting area L2), and/or a third guide portion 461c connecting the first guide portion 461a and the second guide portion 461b to each other. For example, on the window frame 251, the first guide portion 461a may be accommodated in the first opening 351a, and the second guide portion 461b and the third guide portion 461c may be substantially disposed in the light guide groove 351c. In an embodiment, the third guide portion 461c or a partial area of the light guide groove 351c (e.g., the area in which the third guide portion 461c is positioned) may function as a light waveguide between the first guide portion 461a (e.g., the first light emitting area L1 in FIG. 9) and the second guide portion 461b (e.g., the second light emitting area L2 in FIG. 9).

According to various embodiments, the light emitted from the light source 331 may generally pass through the first guide portion 461a to be emitted to the outside through the first light emitting area L1, and a part of the light emitted from the light source 331 may be guided to the second guide portion 461b through the first guide portion 461a and the third guide portion 461c to be emitted to the outside from the second guide portion 461b. In an embodiment, the second light emitting area L2 may have a closed curve shape, and the second guide portion 461b may have a ring shape corresponding to the second light emitting area L2. Similar to the previous embodiments, the light guide member 461 includes a reflective structure, a lens structure, or a refraction pattern so that a part of the light emitted from the light source 331 can be guided to the third guide portion 461c and/or the second guide portion 461b. In performing close-up shot, the electronic device 200 or the processor may acquire an image using a camera (e.g., the first camera 333 in FIG. 5) disposed to correspond to the first incident area P1 while providing illumination to a subject O through the second light emitting area L2.

Figure 12:
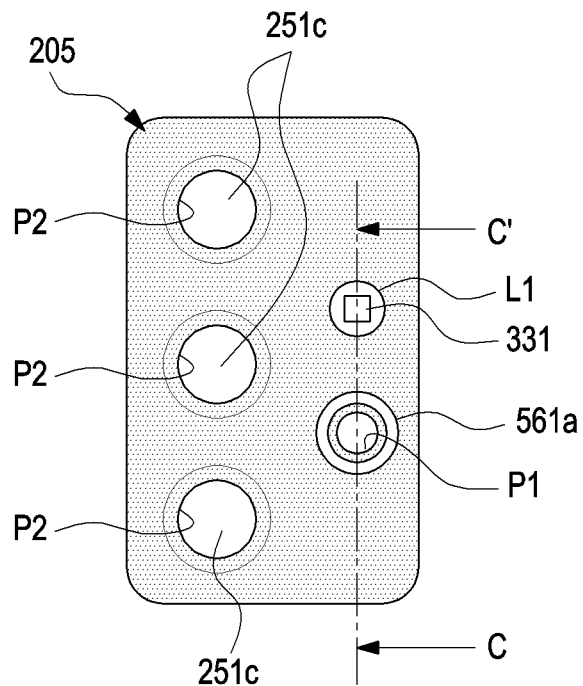
FIG. 12 is a diagram illustrating a portion of an electronic device according to various embodiments.
Figure 13:
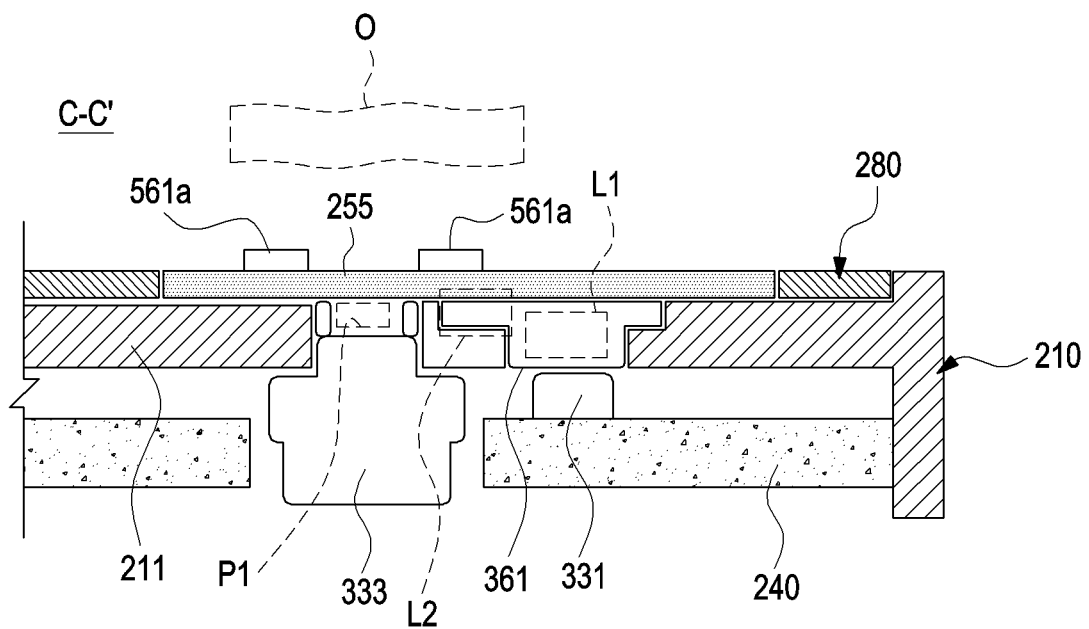
FIG. 13 is a cross-sectional view of the electronic device, taken along line C-C' FIG. 12, according to various embodiments.

FIG. 12 is a diagram illustrating a portion (e.g., a portion in which the camera decoration 205 is disposed) of an electronic device (e.g., the electronic device 100 or 200 in FIGS. 1 to 3 or the electronic device 1001, 1002, or 1004 in FIG. 23) according to various embodiments. FIG. 13 is a cross-sectional view of the electronic device 200, taken along line C-C' in FIG. 12 according to various embodiments.

Referring to FIGS. 12 and 13, the electronic device 200 and/or the camera decoration 205 may further include a reflective member 561a. The reflective member 561a may be made of a sheet or a film including a material capable of reflecting light, and according to an embodiment, may be formed by printing, painting, or depositing a reflective material. The reflective member 561a may be at least partially disposed between the first light emitting area L1 and the second light emitting area L2, and may reflect light incident from the outside or light reflected by a subject O toward the subject O. For example, when the light emitted from the light source 331 is reflected by the subject O, a part of the reflected light may be reflected again by the reflective member 561a and provided as illumination to the subject O. According to an embodiment, the reflective member 561a may be disposed in a closed curve shape around the first incident area P1, or a plurality of reflective members 561a may be arranged along the closed curve trajectory around the first incident area P1.

According to various embodiments, the reflective member 561a may have a structure combined with the second light emitting area L2 in FIG. 6 or FIG. 9. When viewed from the outside, the second light emitting area L2 is an area separated from the first incident area P1, and the light emitted from the second light emitting area L2 may travel toward the subject O, rather than being directly incident on the first incident area P1. In an embodiment, the reflective member 561a may be disposed between the second light emitting area L2 and the first incident area P1, and may reflect again at least a part of the light that has been incident from the outside (or the light reflected by the subject O) and is not incident on the first incident area P1, toward the subject O. When the light emitted from the second light emitting area L2 or the light incident on the first incident area P1 is used for a close-up shot, the light reflected again by the reflective member 561a may be provided to the subject O located within a distance of several tens of centimeters to be used as additional illumination.

Figure 14:
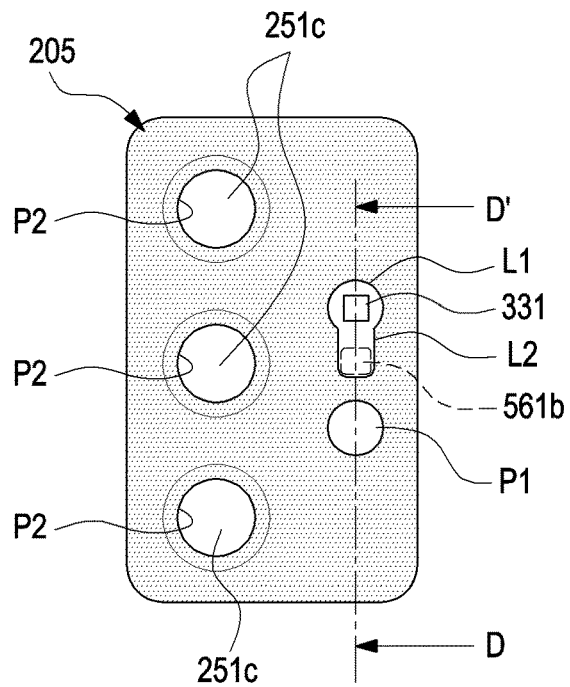
FIG. 14 is a diagram illustrating a portion of an electronic device according to various embodiments.
Figure 15:
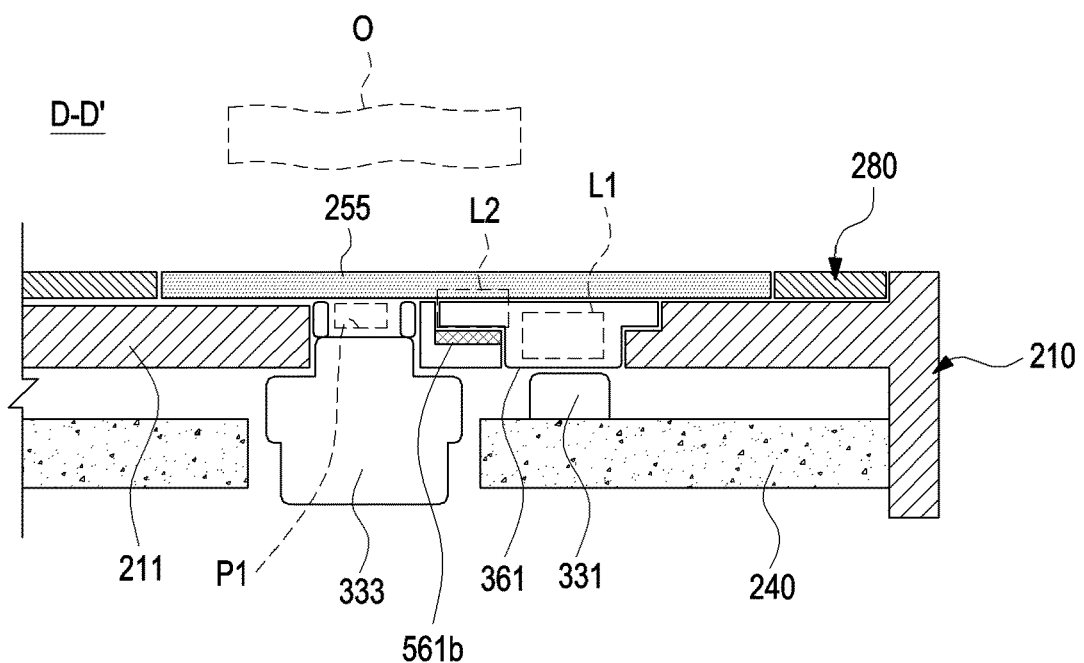
FIG. 15 is a cross-sectional view illustrating the electronic device, taken along line D-D' of FIG. 14, according to various embodiments.

FIG. 14 is a diagram illustrating a portion (e.g., a portion in which the camera decoration 205 is disposed) of an electronic device (e.g., the electronic device 100 or 200 in FIGS. 1 to 3 or the electronic device 1001, 1002, or 1004 in FIG. 23) according to various embodiments. FIG. 15 is a cross-sectional view illustrating the electronic device 200, taken along line D-D' in FIG. 14 according to various embodiments.

Referring to FIGS. 14 and 15, the reflective member 561b may be provided in the light guide groove 351c of FIG. 5 or the light guide member 361 of FIG. 7. For example, in a structure in which the second light emitting area L2 extends from the first light emitting area L1 toward the first incident area P1, the reflective member 561b may be disposed in the second light emitting area L2. In various embodiments, in the structure in which the transfer area L3 of FIG. 9 is visually exposed to the outside, the reflective member 561b may be disposed in the second light emitting area L2 and/or the transfer area L3. The reflective member 561b disposed in the second light emitting area L2 and/or the transfer area L3 of FIGS. 6 and 9 may be combined with the reflection structure, refraction structure, and/or scattering structure provided in the light guide groove 351c or the light guide member 361 or 461 to guide the light emitted from the light source 331 toward a subject directed by the first camera 333 or to reflect at least a part of the light incident from the outside (or the light reflected by the subject O) toward the subject O.

Figure 16:
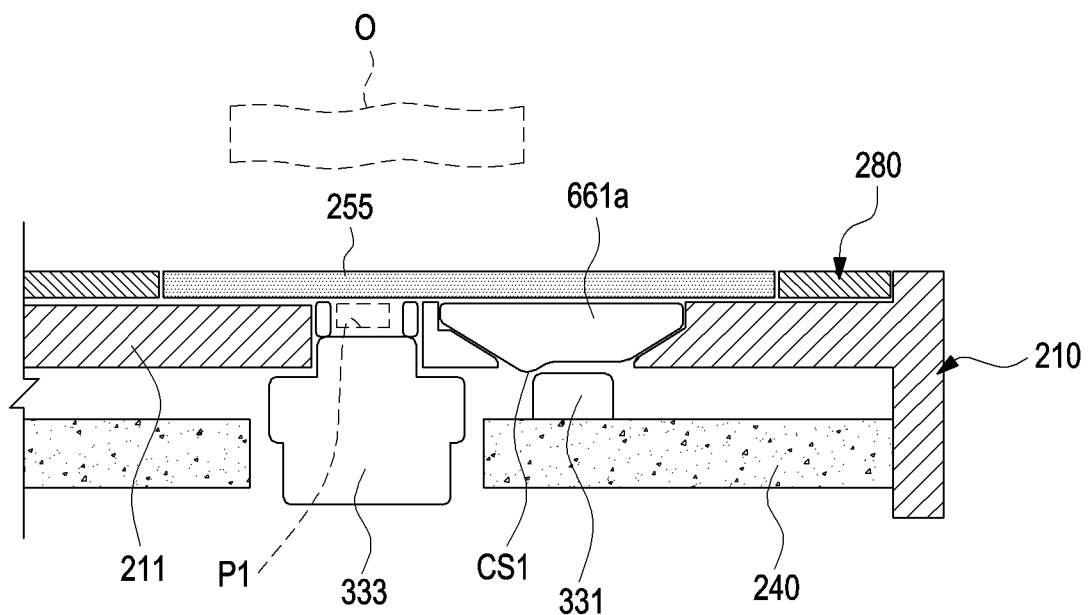
FIG. 16 is a cross-sectional view illustrating a portion of an electronic device according to various embodiments.
Figure 17:
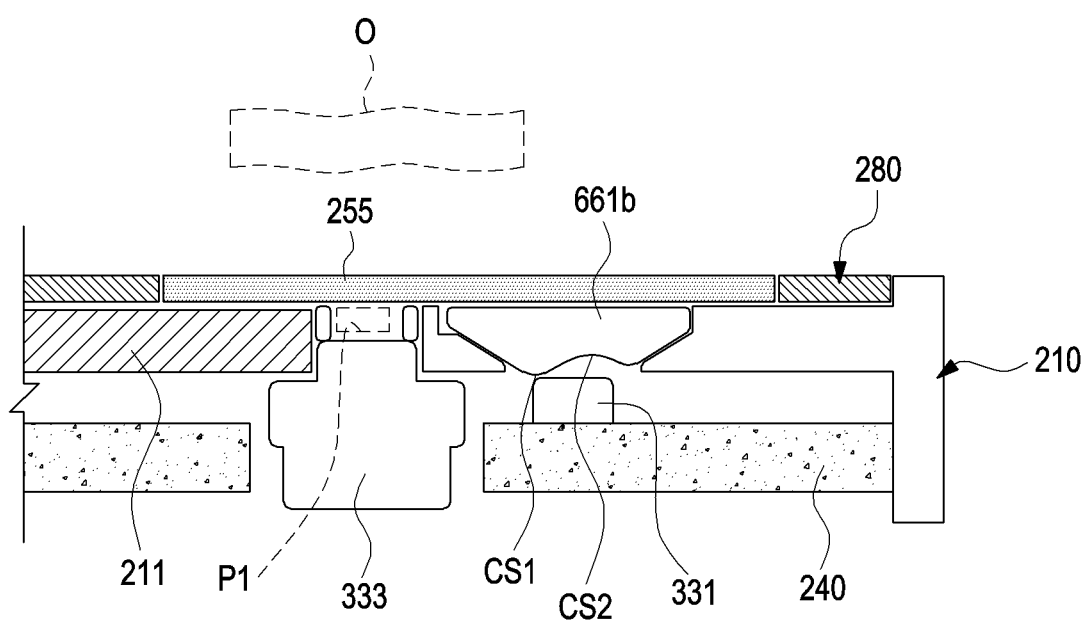
FIG. 17 is a cross-sectional view illustrating a portion of an electronic device according to various embodiments.

FIG. 16 is a cross-sectional view illustrating a portion (e.g., a portion in which the camera decoration 205 is disposed) of an electronic device (e.g., the electronic device 100 or 200 in FIGS. 1 to 3 or the electronic device 1001, 1002, or 1004 in FIG. 23) according to various embodiments. FIG. 17 is a cross-sectional view illustrating a portion of the electronic device 200 according to various embodiments.

Referring to FIGS. 16 and 17, the electronic device 200 and/or the camera decoration (e.g., the camera decoration 205 in FIGS. 3 to 5) may guide a part of the light emitted from the light source 331 in a direction in which the first camera 333 is oriented by including a lens structure (e.g., a curved surface CS1 or CS2). For example, the lens structure may be implemented on one surface of a light guide member 661a or 661b (e.g., the first guide portion 361a or 461a of FIG. 8 or 11). According to an embodiment, the light guide member 661a or 661b may include a first curved surface CS1 on the surface facing the light source 331, thereby guiding at least a part of the light incident on the first curved surface CS1 to the first camera 333 side or toward the subject O. In an embodiment, the light guide member 661a or 661b may include a second curved surface CS2 extending from the first curved surface CS1, and light incident on the second curved surface CS2 may be emitted to be parallel to the direction in which the first camera 333 is oriented. In an embodiment, a direction or an angle range in which light is emitted may be variously set depending on the curvature or the curved shape of the first curved surface CS1 or the second curved surface CS2.

Figure 18:
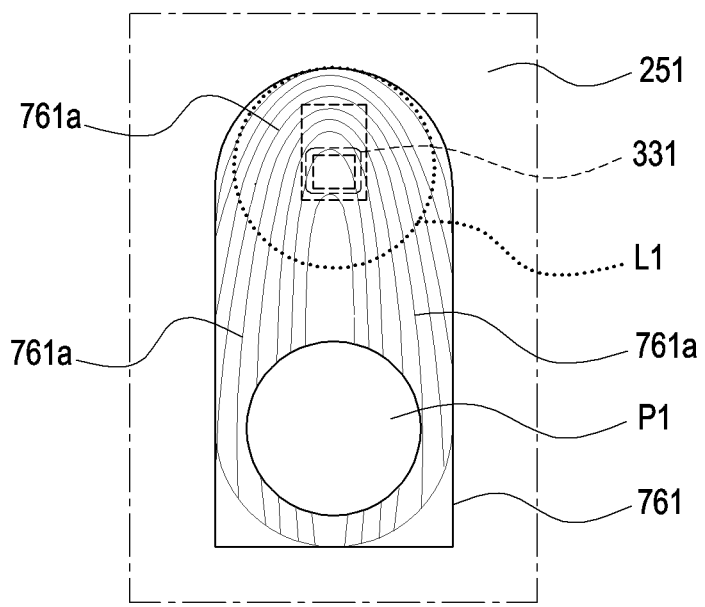
FIG. 18 is an enlarged view illustrating a portion of a window frame in an electronic device according to various embodiments.
Figure 19:
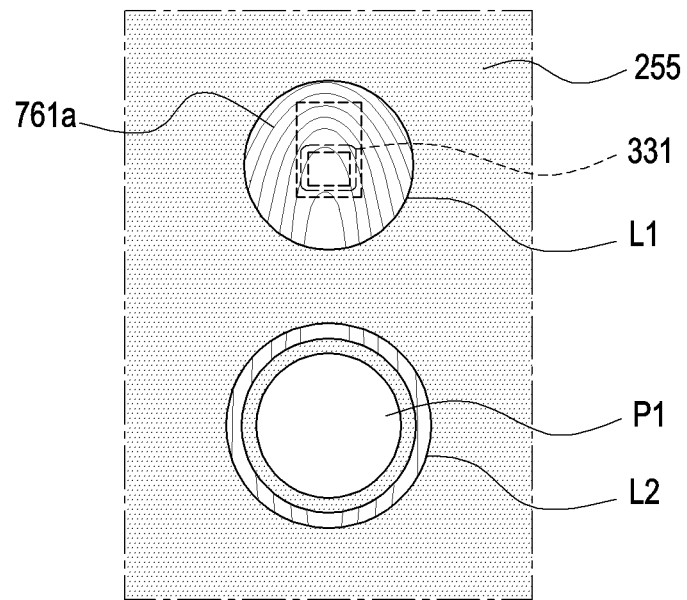
FIG. 19 is an enlarged view illustrating a state in which a dummy plate and/or a window are disposed on a window frame in an electronic device according to various embodiments.

FIG. 18 is an enlarged view illustrating a portion of a window frame 251 in an electronic device (e.g., the electronic device 100 or 200 in FIGS. 1 to 3 or the electronic device 1001, 1002 or 1004 in FIG. 23) according to various embodiments. FIG. 19 is an enlarged view illustrating a state in which a dummy plate 253 and/or a window 255 are arranged in the window frame 251 in an electronic device 200 according to various embodiments.

Referring 18 and 19, the electronic device 200 and/or the camera decoration (e.g., the camera decoration 205 in FIGS. 3 to 5) may guide a part of the light emitted from the light source 331 from the first light emitting area L1 toward the first incident area P1 by including a refraction pattern 761a. The refraction pattern 761a may be provided on the inner surface of the window 255 or the dummy plate 253, for example, in the first opening 351a, the light guide groove 351c, and/or an area corresponding thereto in FIG. 5. In the illustrated embodiment, the refraction pattern 761a may be provided in a predetermined area 761 including the first emitting area L1 and/or the first incident area P1, and may be substantially visually concealed the window 255 by the window 255 and/or the dummy plate 253 in the state in which the window 255 and/or the dummy plate 253 are disposed. In an embodiment, the refraction pattern 761a is substantially concealed by the window 255 and/or the dummy plate 253, but a portion thereof may be visually exposed in the first light emitting area L1 or the second light emitting area L2. The refraction pattern 761a is not limited to the illustrated embodiment, and may be provided in various shapes in consideration of the amount of light to be emitted through the second light emitting area L2 among the light emitted from the light source 331.

Figure 20:
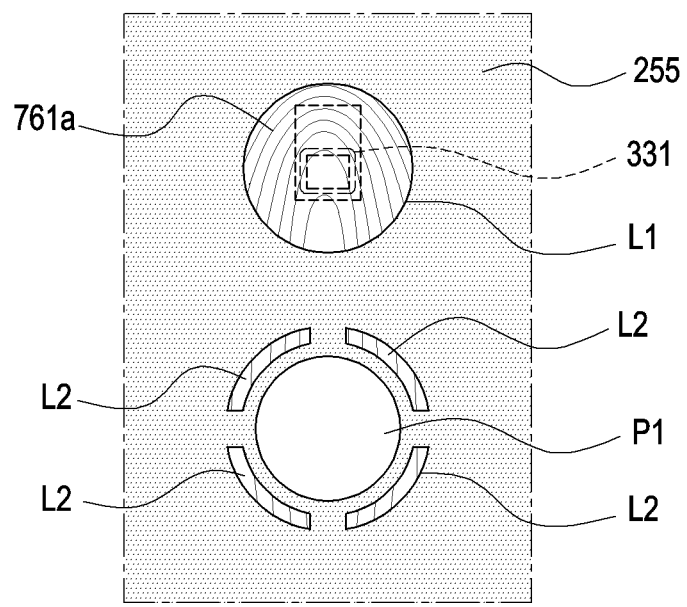
FIG. 20 is an enlarged view illustrating a state in which a dummy plate and/or a window of a modification are disposed in an electronic device according to various embodiments.

FIG. 20 is an enlarged view illustrating the state in which a dummy plate 253 and/or a window 255 in a modification are arranged in an electronic device (e.g., the electronic device 100 or 200 in FIGS. 1 to 3 or the electronic device 1001, 1002, or 1004 in FIG. 23) according to various embodiments.

Referring to FIG. 20, the second light emitting area L2 may be substantially defined by a printed layer or a light blocking layer provided on the window 255 and/or the dummy plate 253. In the embodiment of FIG. 19, the second light emitting area L2 may have a closed curve shape surrounding the first incident area P1, and in the embodiment of FIG. 20, a plurality of second light emitting areas L2 may be arranged along a closed curve trajectory around the first incident area P1. In the illustrated embodiment, the configuration in which four second light emitting areas L2 are formed is illustrated, but it should be noted that various embodiments disclosed herein are not limited thereto. For example, some of the second light emitting areas L2 of FIG. 20 may be omitted, and a second light emitting area (not illustrated) may be additionally disposed. The additionally disposed second light emitting area may be disposed to form a concentric trajectory with the second light emitting areas L2 of FIG. 20, or may be disposed between two adjacent second light emitting areas L2. In various embodiments, the refraction pattern 761a may be provided on the light guide member 361 or 461 in FIG. 8 or 11, and may be selectively combined with the reflective members 561a and 561b of FIGS. 12 to 15 and/or the lens structures (e.g., the curved surfaces CS1 and CS2) in FIGS. 16 and 17.

Figure 21:
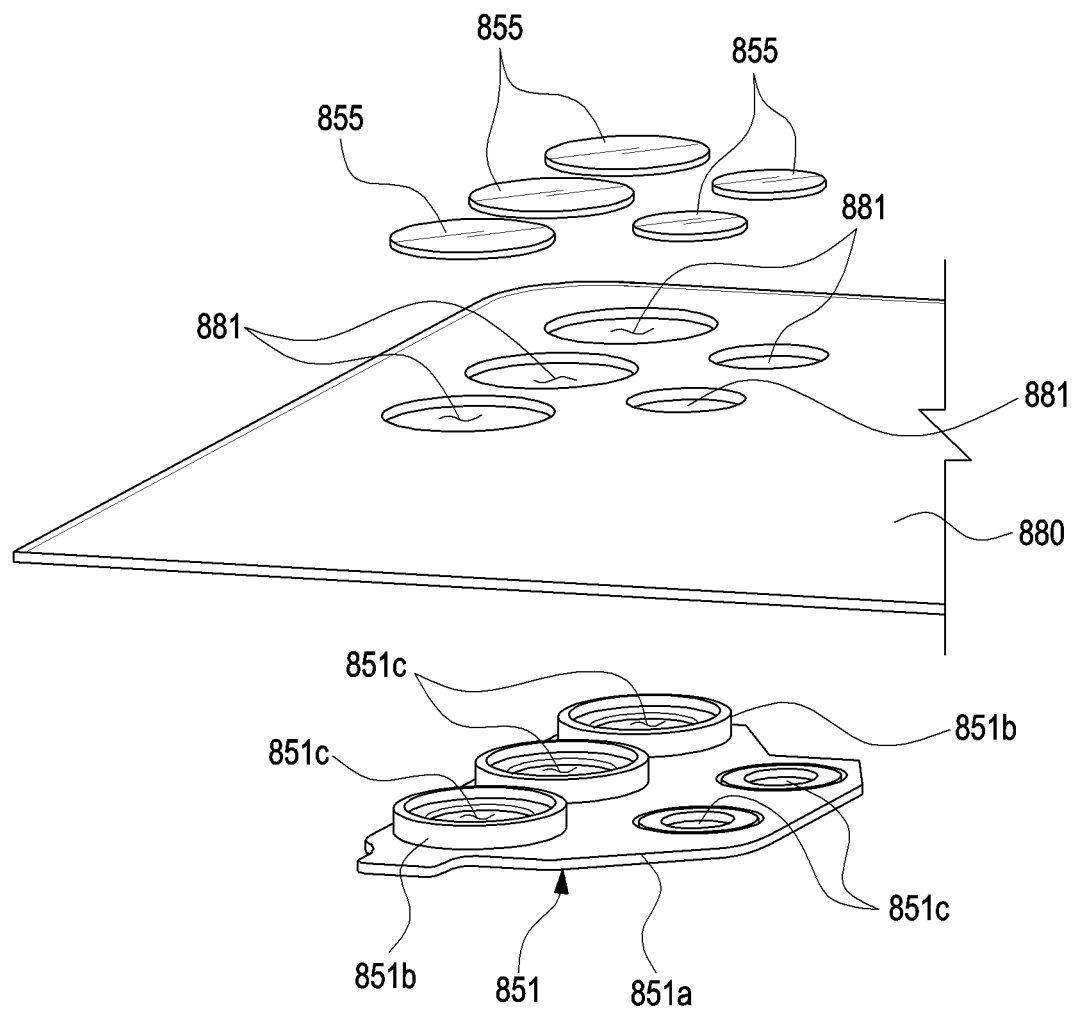
FIG. 21 is a partial exploded perspective vies and a perspective view illustrating light blocking walls of a camera cover in an electronic device according to various embodiments.

FIG. 21 is a partial perspective view and a partial exploded perspective view illustrating a light blocking wall 851b of a camera decoration (e.g., the camera decoration 205 in FIGS. 3 to 5) in an electronic device (e.g., the electronic device 100 or 200 in FIGS. 1 to 3 or the electronic device 1001, 1002, or 1004 in FIG. 23) according to various embodiments.

Referring to FIG. 21, the electronic device 200 and/or the camera decoration 205 may include a window frame 851 providing a plurality of openings 851c, and windows 855 corresponding to the openings 851c, respectively. In an embodiment, the window frame 851 may include a plurality of light blocking walls 851b, and some of the openings 851c may be provided in the state of being surrounded by the light blocking walls 851b. For example, some of the openings 851c may be provided through the base plate 851a in an area surrounded by any one of the light blocking walls 851b. In various embodiments, a rear plate 880 (e.g., the rear plate 280 in FIG. 3) may include opening areas 881 corresponding to respective light blocking walls 851b or openings 851c, and the light blocking walls 851b or openings 851c may be disposed to correspond to one of the opening areas 881.

According to various embodiments, the window frame 851 may be coupled to the rear plate 880 in the state in which the base plate 851a faces the inner surface of the rear plate 880. When the window frame 851 is coupled to the rear plate 880, the light blocking walls 851b may be accommodated in any one of the opening areas 881. In various embodiments, some of the openings 851c may be provided through the base plate 851a in an area in which the light blocking walls 851b are not present, and may be aligned with any one of the opening areas 881. In an embodiment, the windows 855 may have a shape corresponding to any one of the openings 851c, and may be coupled to the window frame 851 to close the openings 851c. For example, the window 855 may be coupled to the inner surface of any one of the light blocking walls 851b.

According to various embodiments, the rear plate 880 or the window 855 may guide the light emitted from a light source (e.g., the light source 331 in FIG. 5) to an area other than the first light emitting area L1 or the second light emitting area L2. For example, depending on the angle of light incident to the air from an inner portion of the rear plate 880 or the window 855, light may be transferred in a direction other than the direction in which the light source 331 is oriented or the designed direction of a lens structure (e.g., the curved surfaces CS1 and CS2 of FIG. 16 or FIG. 17), or a refraction pattern (e.g., the refraction pattern 761a in FIGS. 18 to 20). When light guided inside the rear plate 880 or the window 855 is incident on the first incident area P1 or the second incident area P2, the quality of images acquired through the camera(s) (e.g., the cameras 231, 233, 235, and 333 of FIG. 3 or FIG. 5) may be degraded. According to various embodiments disclosed herein, since the electronic device 200 or the camera decoration 205 includes the light blocking walls 851b, it is possible to block light guided inside the rear plate 880 or the window 855 from being incident to the incident area P1 or the second incident area P2 and to reduce or prevent the quality of acquired images from being degraded.

In the illustrated embodiment, the configuration in which the light blocking walls 851b are provided around some of the openings 851c is illustrated, but it should be noted that various embodiments disclosed herein are not limited thereto. For example, light blocking walls 851b may be provided around light emitting areas (e.g., the light emitting areas L1 and L2 in FIG. 6 or 9), and the positions, shapes, or number of light blocking walls 851b may be appropriately selected in consideration of the specifications of an actually manufactured electronic device 200 or camera decoration 205. One of modifications of the structure in which the light blocking walls 851b are provided will be described with further reference to FIG. 22.

Figure 22:
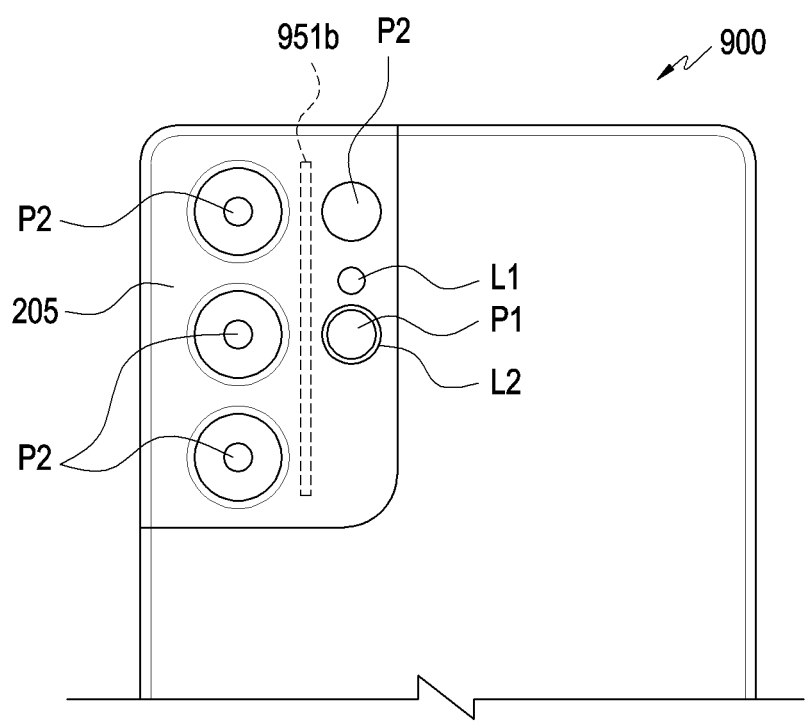
FIG. 22 is a diagram illustrating light blocking walls of a camera cover in an electronic device according to various embodiments.

FIG. 22 is a diagram illustrating a modification of a light blocking wall 951b of a camera decoration 205 in an electronic device 900 (e.g., the electronic device 100 or 200 in FIGS. 1 to 3 or the electronic device 1001, 1002, or 1004 in FIG. 23) according to various embodiments.

Further referring to FIG. 22, a light source (e.g., the first light emitting area L1) may be disposed closer a first camera (e.g., the first incident area P1) than other cameras (e.g., the second incidence areas P2). When the first light emitting area L1 and the first incident area P1 are disposed close to each other, a second light emitting area L2 may be omitted. In various embodiments, the light blocking wall 951b may be provided at least partially between the first light emitting area L1 and the second incident areas P2. For example, the light blocking wall 951b may block the light emitted from the first light emitting area L1 from being directly incident on the second incident area P2 through a rear plate (e.g., the rear plate 280 in FIG. 3) or a window (e.g., the window 255 in FIG. 3 or FIG. 5). In various embodiments, the light blocking wall 951b may be disposed in at least a portion of the space between the second light emitting area L2 and the second incident area P2. For example, the light blocking wall 951b may prevent and/or reduce the light emitted passing through the second light emitting area L2 from being incident on the second incident area P2 through the rear plate (e.g., the rear plate 280 in FIG. 3) or the window (e.g., the window 255 in FIG. 3 or FIG. 5).

As described above, it should be noted that the positions, shapes, or number of light blocking walls 951b are not limited to the illustrated embodiment as long as it is possible to prevent and/or reduce light emitted from the light source 331 or light passing through the light emitting areas L1 and L2 from being directly incident on the first incident region P1 or the second incident region P2.

Figure 23:
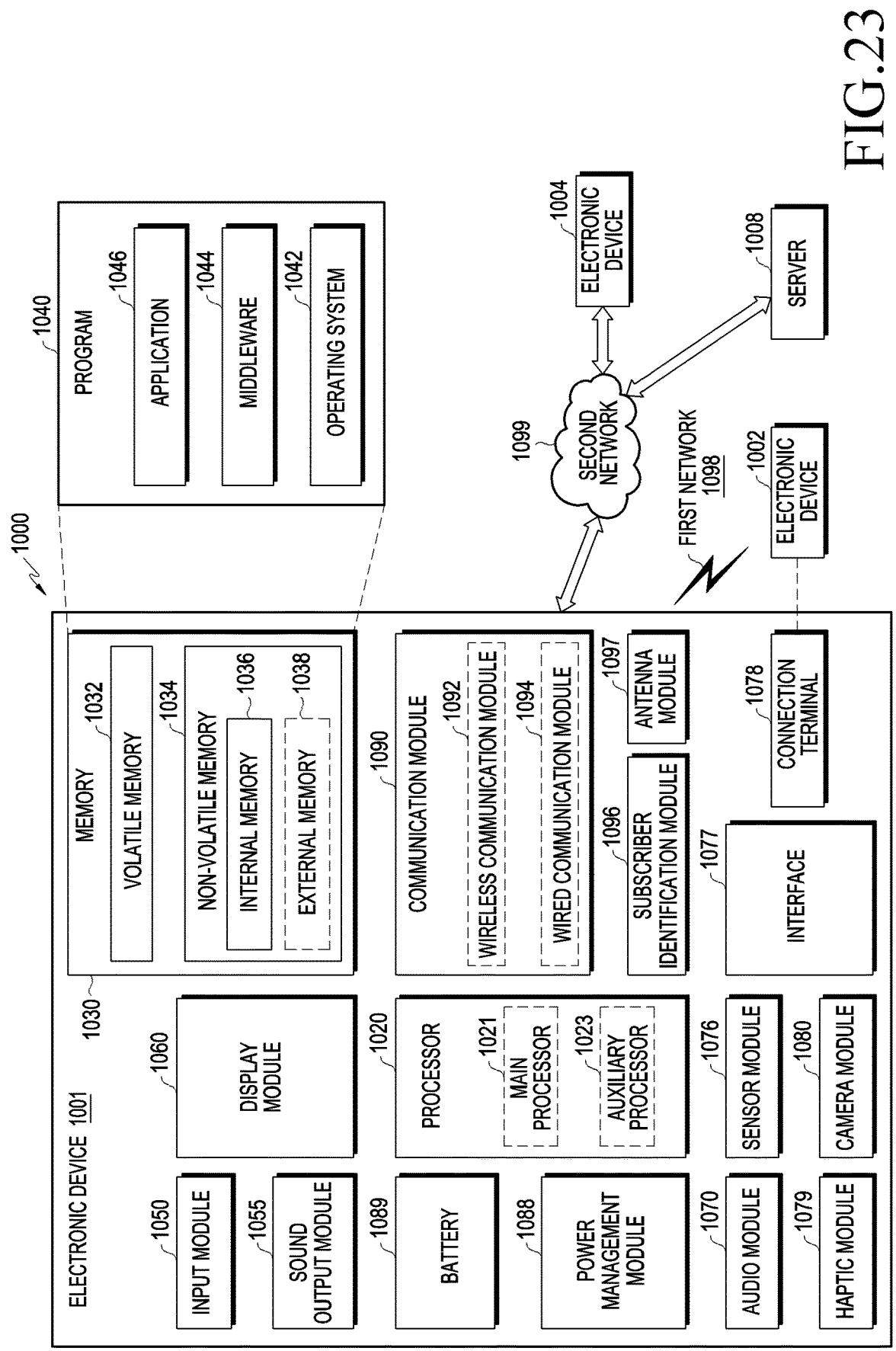
FIG. 23 is a block diagram illustrating an example electronic device in a network environment according to various embodiments.

FIG. 23 is a block diagram illustrating an example electronic device 1001 (e.g., electronic devices 100 and 200 of FIGS. 1 to 3) in a network environment 100 according to various embodiments.

Referring to FIG. 23, the electronic device 1001 in the network environment 1000 may communicate with an electronic device 1002 via a first network 1098 (e.g., a short-range wireless communication network), or at least one of an electronic device 1004 or a server 1008 via a second network 1099 (e.g., a long-range wireless communication network). According to an embodiment, the electronic device 1001 may communicate with the electronic device 1004 via the server 1008. According to an embodiment, the electronic device 1001 may include a processor 1020, memory 1030, an input module 1050, a sound output module 1055, a display module 1060, an audio module 1070, a sensor module 1076, an interface 1077, a connecting terminal 1078, a haptic module 1079, a camera module 1080, a power management module 1088, a battery 1089, a communication module 1090, a subscriber identification module (SIM) 1096, or an antenna module 1097. In various embodiments, at least one of the components (e.g., the connecting terminal 1078) may be omitted from the electronic device 1001, or one or more other components may be added in the electronic device 1001. In various embodiments, some of the components (e.g., the sensor module 1076, the camera module 1080, or the antenna module 1097) may be implemented as a single component (e.g., the display module 1060).

The processor 1020 may execute, for example, software (e.g., a program 1040) to control at least one other component (e.g., a hardware or software component) of the electronic device 1001 coupled with the processor 1020, and may perform various data processing or computation. According to an embodiment, as at least part of the data processing or computation, the processor 1020 may store a command or data received from another component (e.g., the sensor module 1076 or the communication module 1090) in volatile memory 1032, process the command or the data stored in the volatile memory 1032, and store resulting data in non-volatile memory 1034. According to an embodiment, the processor 1020 may include a main processor 1021 (e.g., a central processing unit (CPU) or an application processor (AP)), or an auxiliary processor 1023 (e.g., a graphics processing unit (GPU), a neural processing unit (NPU), an image signal processor (ISP), a sensor hub processor, or a communication processor (CP)) that is operable independently from, or in conjunction with, the main processor 1021. For example, when the electronic device 1001 includes the main processor 1021 and the auxiliary processor 1023, the auxiliary processor 1023 may be adapted to consume less power than the main processor 1021, or to be specific to a specified function. The auxiliary processor 1023 may be implemented as separate from, or as part of the main processor 1021.

The auxiliary processor 1023 may control, for example, at least some of functions or states related to at least one component (e.g., the display module 1060, the sensor module 1076, or the communication module 1090) among the components of the electronic device 101, instead of the main processor 1021 while the main processor 1021 is in an inactive (e.g., sleep) state, or together with the main processor 1021 while the main processor 1021 is in an active (e.g., executing an application) state. According to an embodiment, the auxiliary processor 1023 (e.g., an image signal processor or a communication processor) may be implemented as part of another component (e.g., the camera module 1080 or the communication module 1090) functionally related to the auxiliary processor 1023. According to an embodiment, the auxiliary processor 1023 (e.g., the neural processing unit) may include a hardware structure specified for artificial intelligence model processing. An artificial intelligence model may be generated by machine learning. Such learning may be performed, e.g., by the electronic device 1001 where the artificial intelligence model is performed or via a separate server (e.g., the server 1008). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1030 may store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034.

The program 1040 may be stored in the memory 1030 as software, and may include, for example, an operating system (OS) 1042, middleware 1044, or an application 1046.

The input module 1050 may receive a command or data to be used by another component (e.g., the processor 1020) of the electronic device 1001, from the outside (e.g., a user) of the electronic device 1001. The input module 1050 may include, for example, a microphone, a mouse, a keyboard, a key (e.g., a button), or a digital pen (e.g., a stylus pen).

The sound output module 1055 may output sound signals to the outside of the electronic device 1001. The sound output module 1055 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1060 may visually provide information to the outside (e.g., a user) of the electronic device 1001. The display module 1060 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 1070 may convert a sound into an electrical signal and vice versa. According to an embodiment, the audio module 1070 may obtain the sound via the input module 1050, or output the sound via the sound output module 1055 or an external electronic device (e.g., an electronic device 1002 (e.g., a speaker or a headphone)) directly or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. According to an embodiment, the sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device (e.g., the electronic device 1002) directly or wirelessly. According to an embodiment, the interface 1077 may include, for example, a high definition multimedia interface (HDMI), a universal serial bus (USB) interface, a secure digital (SD) card interface, or an audio interface.

A connecting terminal 1078 may include a connector via which the electronic device 1001 may be physically connected with the external electronic device (e.g., the electronic device 1002). According to an embodiment, the connecting terminal 1078 may include, for example, an HDMI connector, a USB connector, an SD card connector, or an audio connector (e.g., a headphone connector).

The haptic module 1079 may convert an electrical signal into a mechanical stimulus (e.g., a vibration or a movement) or electrical stimulus which may be recognized by a user via his tactile sensation or kinesthetic sensation. According to an embodiment, the haptic module 1079 may include, for example, a motor, a piezoelectric element, or an electric stimulator.

The camera module 1080 may capture a still image or moving images. According to an embodiment, the camera module 1080 may include one or more lenses, image sensors, image signal processors, or flashes.

The power management module 1088 may manage power supplied to the electronic device 1001. According to an embodiment, the power management module 1088 may be implemented as at least part of, for example, a power management integrated circuit (PMIC).

The battery 1089 may supply power to at least one component of the electronic device 1001. According to an embodiment, the battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently from the processor 1020 (e.g., the application processor (AP)) and supports a direct (e.g., wired) communication or a wireless communication. According to an embodiment, the communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth™, wireless-fidelity (Wi-Fi) direct, or infrared data association (IrDA)) or the second network 1099 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1092 may identify or authenticate the electronic device 1001 in a communication network, such as the first network 1098 or the second network 1099, using subscriber information (e.g., international mobile subscriber identity (IMSI)) stored in the subscriber identification module 1096.

The wireless communication module 1092 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1092 may support a high-frequency band (e.g., the mmWave band) to achieve, e.g., a high data transmission rate. The wireless communication module 1092 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1092 may support various requirements specified in the electronic device 1001, an external electronic device (e.g., the electronic device 1004), or a network system (e.g., the second network 1099). According to an embodiment, the wireless communication module 1092 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1097 may transmit or receive a signal or power to or from the outside (e.g., the external electronic device) of the electronic device 1001. According to an embodiment, the antenna module 1097 may include an antenna including a radiating element including a conductive material or a conductive pattern formed in or on a substrate (e.g., a printed circuit board (PCB)). According to an embodiment, the antenna module 1097 may include a plurality of antennas (e.g., array antennas). In such a case, at least one antenna appropriate for a communication scheme used in the communication network, such as the first network 1098 or the second network 1099, may be selected, for example, by the communication module 1090 from the plurality of antennas. The signal or the power may then be transmitted or received between the communication module 1090 and the external electronic device via the selected at least one antenna. According to an embodiment, another component (e.g., a radio frequency integrated circuit (RFIC)) other than the radiating element may be additionally formed as part of the antenna module 1097.

According to various embodiments, the antenna module 1097 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1001 and the external electronic device 1004 via the server 1008 coupled with the second network 1099. Each of the external electronic devices 1002 or 104 may be a device of a same type as, or a different type, from the electronic device 1001. According to an embodiment, all or some of operations to be executed at the electronic device 1001 may be executed at one or more of the external electronic devices 1002, 1004, or 108. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1001. The electronic device 1001 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 1004 may include an internet-of-things (IoT) device. The server 1008 may be an intelligent server using machine learning and/or a neural network. According to an embodiment, the external electronic device 1004 or the server 1008 may be included in the second network 1099. The electronic device 1001 may be applied to intelligent services (e.g., smart home, smart city, smart car, or healthcare) based on 5G communication technology or IoT-related technology.

Figure 24:
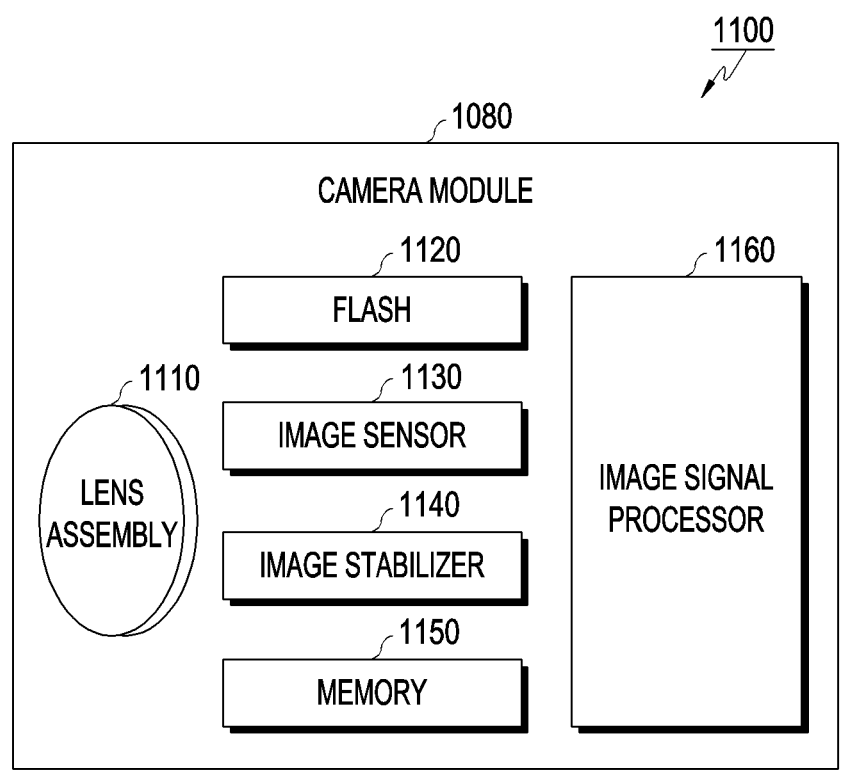
FIG. 24 is a block diagram illustrating an example configuration of a camera module according to various embodiments.

FIG. 24 is a block diagram illustrating an example configuration of the camera module 1100 (e.g., the camera 231, 233, 235, or 333 of FIG. 3 or FIG. 5 or the camera module 1080 of FIG. 23) according to various embodiments of the disclosure.

Referring to FIG. 24, the camera module 1080 may include a lens assembly 1110, a flash 1120, an image sensor 1130, an image stabilizer (e.g., including image stabilizing circuitry) 1140, memory 1150 (e.g., buffer memory), or an image signal processor (e.g., including processing circuitry) 1160. The lens assembly 1110 may collect light emitted or reflected from an object whose image is to be taken. The lens assembly 1110 may include one or more lenses. According to an embodiment, the camera module 1080 may include a plurality of lens assemblies 1110. In such a case, the camera module 1080 may form, for example, a dual camera, a 360-degree camera, or a spherical camera. Some of the plurality of lens assemblies 1110 may have the same lens attribute (e.g., view angle, focal length, auto-focusing, f number, or optical zoom), or at least one lens assembly may have one or more lens attributes different from those of another lens assembly. The lens assembly 1110 may include, for example, a wide-angle lens or a telephoto lens.

The flash 1120 may emit light that is used to reinforce light reflected from an object. According to an embodiment, the flash 1120 may include one or more light emitting diodes (LEDs) (e.g., a red-green-blue (RGB) LED, a white LED, an infrared (IR) LED, or an ultraviolet (UV) LED) or a xenon lamp. The image sensor 1130 may obtain an image corresponding to an object by converting light emitted or reflected from the object and transmitted via the lens assembly 1110 into an electrical signal. According to an embodiment, the image sensor 1130 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 1130 may be implemented using, for example, a charged coupled device (CCD) sensor or a complementary metal oxide semiconductor (CMOS) sensor.

The image stabilizer 1140 may move the image sensor 1130 or at least one lens included in the lens assembly 1110 in a particular direction, or control an operational attribute (e.g., adjust the read-out timing) of the image sensor 1130 in response to the movement of the camera module 1080 or the electronic device 1101 including the camera module 1080. This allows compensating for at least part of a negative effect (e.g., image blurring) by the movement on an image being captured. According to an embodiment, the image stabilizer 1140 may sense such a movement by the camera module 1080 or the electronic device 1101 using a gyro sensor (not shown) or an acceleration sensor (not shown) disposed inside or outside the camera module 1080. According to an embodiment, the image stabilizer 1140 may be implemented, for example, as an optical image stabilizer. The memory 1150 may store, at least temporarily, at least part of an image obtained via the image sensor 1130 for a subsequent image processing task. For example, if image capturing is delayed due to shutter lag or multiple images are quickly captured, a raw image obtained (e.g., a Bayer-patterned image, a high-resolution image) may be stored in the memory 1150, and its corresponding copy image (e.g., a low-resolution image) may be previewed via the display module 1160. Thereafter, if a specified condition is met (e.g., by a user's input or system command), at least part of the raw image stored in the memory 1150 may be obtained and processed, for example, by the image signal processor 1160. According to an embodiment, the memory 1150 may be configured as at least part of the memory 1130 or as a separate memory that is operated independently from the memory 1130.

The image signal processor 1160 may perform one or more image processing with respect to an image obtained via the image sensor 1130 or an image stored in the memory 1150. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 1160 may perform control (e.g., exposure time control or read-out timing control) with respect to at least one (e.g., the image sensor 1130) of the components included in the camera module 1080. An image processed by the image signal processor 1160 may be stored back in the memory 1150 for further processing, or may be provided to an external component (e.g., the memory 1130, the display module 1160, the electronic device 1102, the electronic device 1104, or the server 1108) outside the camera module 1080. According to an embodiment, the image signal processor 1160 may be configured as at least part of the processor 1120, or as a separate processor that is operated independently from the processor 1120. If the image signal processor 1160 is configured as a separate processor from the processor 1120, at least one image processed by the image signal processor 1160 may be displayed, by the processor 1120, via the display module 1160 as it is or after being further processed.

According to an embodiment, the electronic device 1101 may include a plurality of camera modules 1080 having different attributes or functions. In such a case, at least one of the plurality of camera modules 1080 may form, for example, a wide-angle camera and at least another of the plurality of camera modules 1080 may form a telephoto camera. Similarly, at least one of the plurality of camera modules 1080 may form, for example, a front camera and at least another of the plurality of camera modules 1080 may form a rear camera.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device). For example, a processor (e.g., the processor) of the machine (e.g., the electronic device) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

As described above, according to various example embodiments, an electronic device (e.g., the electronic device 100 or 200 in FIGS. 1 to 3) may include: a housing (e.g., the housing 110 or 210 in FIGS. 1 to 3), a plurality of cameras (e.g., the cameras 231, 233, 235, and 333 in FIG. 3 or FIG. 5) disposed on one surface of the housing, a light source (e.g., the light source 331 in FIG. 5) disposed adjacent to at least one of the plurality of cameras on the one surface of the housing, and a camera cover (e.g., the camera decoration 205 in FIGS. 3 to 5 or FIG. 9) disposed on the housing, wherein the camera cover is disposed to cover at least a portion of the plurality of cameras and/or the light source. The camera cover may include: a first light emitting area (e.g., the first transmissive area 353a in FIG. 5 or the first light emitting area L1 in FIG. 9) corresponding to the light source and configured to emit a part of light emitted from the light source to the outside, a first incident area (e.g., the second transmissive area 353b in FIG. 5 or the first light incident area P1 in FIG. 9) corresponding to a first camera (e.g., the first camera 333 in FIG. 5) among the plurality of cameras and configured to allow and/or guide external light to be incident on the first camera, and at least one second light emitting area (e.g., the second light emitting area L2 in FIG. 6 or FIG. 9) positioned closer to the first incident area than the first light emitting area, wherein the at least one second light emitting area is configured to emit another part of the light emitted from the light source to the outside.

According to various example embodiments, the second light emitting area may extend from the first light emitting area toward the first incident area (e.g., see FIG. 6).

According to various example embodiments, the camera cover may further include at least one reflective member (e.g., the reflective members 561a and 561b in FIG. 12 or FIG. 15) comprising a reflective material disposed at least partially between the first light emitting area and the second light emitting area, and the reflective member may be configured to reflect light incident from the outside.

According to various example embodiments, the reflective member may extend or be arranged along a closed curve surrounding the first incident area.

According to various example embodiments, the second light emitting area may extend from the first light emitting area toward the first incident area, and the reflective member may be disposed in the second light emitting area (see FIG. 14 or FIG. 15).

According to various example embodiments, the second light emitting area may extend or be arranged along a closed curve surrounding the first incident area.

According to various example embodiments, the camera cover may further include an optical waveguide (e.g., the portion of the light guide groove 351c in FIG. 15 or the third guide portion 461c in FIG. 11) connecting the first light emitting area and the second light emitting area to each other, and the optical waveguide may be configured to guide the another part of the light emitted from the light source to the second light emitting area.

According to various example embodiments, the camera cover may further include a window frame (e.g., the window frame 251 in FIGS. 3 to 5) disposed in the housing and including at least one opening, a window (e.g., the window 255 in FIGS. 3 to 5) coupled to the window frame and configured to close the opening, and visually exposing the opening to the outside of the housing, and a light guide (e.g., the light guide member 361 or 461 in FIG. 7, FIG. 8, FIG. 10 and/or FIG. 11) disposed at least partially between the window frame and the window. The light guide may include a first guide portion (e.g., the first guide portion 361a or 461a in FIG. 8 or FIG. 11) corresponding to the first light emitting area, and a second guide portion (e.g., the second guide portion 361b or 461b in FIG. 8 or FIG. 11) corresponding to the second light emitting area.

According to various example embodiments, the light guide may further include a third guide portion (e.g., the third guide portion 461c in FIG. 11) connecting the first guide portion and the second guide portion, and the second guide portion may at least partially surround the perimeter of the first incident area.

According to various example embodiments, the light guide may further include a refraction pattern (e.g., the curved surfaces CS1 and CS2 in FIGS. 16 and 17 or the refractive pattern 761a in FIG. 18) configured to refract or guide the another part of the light emitted from the light source toward the second guide portion.

According to various example embodiments, the camera cover may further include at least one second incident area (e.g., the second incidence area P2 in FIG. 6 or FIG. 9) corresponding to at least one second camera (e.g., the second cameras 231, 233, and 235 in FIG. 5) among the plurality of cameras and configured to allow and/or guide external light to be incident on the first camera, and a light isolating wall (e.g., the light isolating wall 851b or 951b in FIG. 21 or FIG. 22) disposed at least in a portion between the second incident area and the first light emitting area or between the second incident area and the second light emitting area.

According to various example embodiments, the electronic device described above may further include a processor (e.g., the processor 1020 in FIG. 23) configured to: acquire an image of a subject using at least one of the plurality of cameras while providing illumination to the subject by applying a current to the light source.

According to various example embodiments, the processor may be configured to acquire a high magnification image using the first camera among the plurality of cameras.

According to various example embodiments, an electronic device (e.g., the electronic device 100 or 200 of FIGS. 1 to 3) may include a housing (e.g., the housing 110 or 210 in FIGS. 1 to 3), a plurality of cameras (e.g., the cameras 231, 233, 235, and 333 in FIG. 3 or FIG. 5) disposed on one surface of the housing, a light source (e.g., the light source 331 in FIG. 5) disposed adjacent to at least one of the plurality of cameras on the one surface of the housing, a camera cover (e.g., the camera decoration 205 in FIGS. 3 to 5 or FIG. 9) disposed on the housing, wherein the camera cover is disposed to cover at least a portion of the plurality of cameras and/or the light source, and a processor (e.g., the processor 1020 in FIG. 23 or the image signal processor 1160 in FIG. 24). The camera cover may include a first light emitting area (e.g., the first transmissive area 353a in FIG. 5 or the first light emitting area L1 in FIG. 9) corresponding to the light source and configured to emit a part of light emitted from the light source, to the outside, a first incident area (e.g., the second transmissive area 353b in FIG. 5 or the first light incident area P1 in FIG. 9) corresponding to a first camera (e.g., the first camera 333 in FIG. 5) among the plurality of cameras and configured to allow and/or guide external light to be incident on the first camera, and at least one second light emitting area (e.g., the second light emitting area L2 in FIG. 6 or FIG. 9) positioned closer to the first incident area than the first light emitting area, wherein the at least one second light emitting area is configured to emit another part of the light emitted from the light source, to the outside. The processor may be configured to: acquire a subject image using at least the first camera among the plurality of cameras while providing illumination to a subject (e.g., the subject O in FIG. 7 or FIG. 10) by applying a first current to the light source, and provide illumination to the subject by applying a second current greater than the first current to the light source while acquiring another subject image using at least one of the plurality of cameras.

According to various example embodiments, the processor may be configured to acquire a high magnification image using the first camera among the plurality of cameras.

According to various example embodiments, the second light emitting area may extend or be arranged along a closed curve surrounding the first incident area.

According to various example embodiments, the camera cover may further include an optical waveguide (e.g., the portion of the light guide groove 351c in FIG. 15 or the third guide portion 461c in FIG. 11) connecting the first light emitting area and the second light emitting area to each other, and the optical waveguide may be configured to guide the another part of the light emitted from the light source to the second light emitting area.

According to various example embodiments, the camera cover may further include a light guide (e.g., the light guide member 361 or 461 in FIG. 7, FIG. 8, FIG. 10, and/or FIG. 11), and the light guide may include a first guide portion (e.g., the first guide portion 361a or 461a of FIG. 8 or FIG. 11) corresponding to the first light emitting area, a second guide portion (e.g., the second guide portion 361b or 461b in FIG. 8 or FIG. 11) corresponding to the second light emitting area, and a third guide portion (e.g., the third guide portion 461c in FIG. 11) connecting the first guide portion and the second guide portion to each other.

According to various example embodiments, the light guide may further include a lens or a refraction pattern (e.g., the curved surfaces CS1 and CS2 in FIG. 16 and FIG. 17 or the refraction pattern 761a in FIG. 18) configured to guide the another part of the light emitted from the light source from the first guide portion to the second guide portion via the third guide portion.

According to various example embodiments, the second guide portion may have a ring shape extending along a perimeter of the first incident area.

Although the disclosure has been described with reference to various example embodiments, it should be understood that the various example embodiments are not intended to limit the disclosure, but intended to be illustrative. It will be apparent to those skilled in the art that various changes can be made in form and detail without departing from the overall scope of the disclosure, including the appended claims and equivalents. For example, in the above-described embodiments, when a second light emitting area (e.g., the second light emitting area L2 in FIG. 19 or FIG. 20) extends along a closed curve trajectory or a plurality of second light emitting areas are provided, a reflective member(s) 561a of FIG. 12 or FIG. 13 may extend or be arranged along the closed curve trajectory(ies) as being arranged along the closed curve trajectories. In various embodiments, the reflective members 561a of FIG. 13 may be disposed in a single electronic device in combination with the light guide member 461 of FIG. 11. For example, different configurations in the various embodiments described above may be selectively combined to implement additional embodiments. In addition, it will be understood that any of the embodiment(s) described herein may be used in conjunction with any other embodiment(s) described herein.

What is claimed is:

1. An electronic device comprising:
a housing;
a plurality of cameras disposed on a surface of the housing;
a light source disposed adjacent to at least one of the plurality of cameras on the surface of the housing; and
a camera cover disposed on the housing, wherein the camera cover is disposed to cover at least a portion of the plurality of cameras and the light source,
wherein the camera cover includes:
a first opening corresponding to a first light emitting area for the light source, the first light emitting area being configured to emit a part of light emitted from the light source to an outside of the electronic device;
a second opening corresponding to a first light incident area for a first camera among the plurality of cameras, the first light incident area being configured to allow and/or guide light from the outside of the electronic device to be incident on the first camera; and
a second light emitting area corresponding to a portion of a light guide groove extending from the first opening and configured to at least partially surround the second opening, the light guide groove being configured to guide another part of the light emitted from the light source to the second light emitting area to be emitted to the outside of the electronic device.

2. The electronic device of claim 1, wherein
the camera cover further includes at least one reflector comprising a reflective material disposed at least partially between the first light emitting area and the second light emitting area, and
the reflector is configured to reflect light incident thereon from the outside of the electronic device.

3. The electronic device of claim 2, wherein the reflector is disposed in the second light emitting area.

4. The electronic device of claim 1, wherein
the light guide groove comprises an optical waveguide.

5. The electronic device of claim 1, wherein the camera cover further includes:
a window frame disposed in the housing and including at least one opening, wherein the light guide groove is provided on one surface of the window frame;
a window coupled to the one surface of the window frame and configured to close the opening and the light guide groove, and visually exposing the at least one opening to the outside of the electronic device; and
a light guide disposed at least partially between the window frame and the window, wherein
the light guide includes:
a first light guide portion disposed in the first opening and corresponding to the first light emitting area; and
a second light guide portion disposed in the light guide groove and corresponding to the second light emitting area.

6. The electronic device of claim 5, wherein the light guide further includes a third light guide portion disposed in the light guide groove and connecting the first light guide portion and the second light guide portion to each other.

7. The electronic device of claim 5, wherein the light guide further includes a refraction pattern configured to refract or guide the another part of the light emitted from the light source.

8. The electronic device of claim 1, wherein the camera cover further includes:
at least one second light incident area corresponding to at least one second camera among the plurality of cameras and configured to allow and/or guide light from the outside of the electronic device to be incident on the at least one second camera; and
a light isolating wall disposed in at least a portion between the second light incident area and the first light emitting area or between the second light incident area and the second light emitting area.

9. The electronic device of claim 1, further comprising:
at least one processor configured to obtain an image of a subject using at least one of the plurality of cameras while providing illumination to the subject by applying a current to the light source.

10. The electronic device of claim 9, wherein at least one processor is configured to acquire a high magnification image using the first camera.

11. An electronic device comprising:
a housing;
a plurality of cameras disposed on a surface of the housing;
a light source disposed adjacent to at least one of the plurality of cameras on the surface of the housing;
a camera cover disposed on the housing, wherein the camera cover is disposed to cover at least a portion of the plurality of cameras and the light source; and
at least one processor,
wherein the camera cover includes:
a first opening corresponding to a first light emitting area for the light source, the first light emitting area being configured to emit a part of light emitted from the light source to an outside of the electronic device;
a second opening corresponding to a first light incident area for a first camera among the plurality of cameras, the first light incident area being configured to allow and/or guide light from the outside of the electronic device to be incident on the first camera; and
a second light emitting area corresponding to a portion of a light guide groove extending from the first opening and configured to at least partially surround the second opening, the light guide groove being configured to guide another part of the light emitted from the light source to the second light emitting area to be emitted to the outside of the electronic device, and wherein at least one processor is configured to: acquire a subject image using at least the first camera while providing illumination to a subject by applying a first current to the light source, and provide illumination to the subject by applying a second current greater than the first current to the light source while acquiring another subject image using at least one of the plurality of cameras.

12. The electronic device of claim 11, wherein at least one processor is configured to acquire a high magnification image using the first camera.

13. The electronic device of claim 11, wherein the light guide groove comprises an optical waveguide.

14. The electronic device of claim 11, wherein the camera cover further includes a light guide, and wherein the light guide includes:
   a first light guide portion disposed in the first opening and corresponding to the first light emitting area;
   a second light guide portion disposed in the light guide groove and corresponding to the second light emitting area; and
   a third light guide portion disposed in the light guide groove and connecting the first light guide portion and the second light guide portion to each other.

15. The electronic device of claim 14, wherein the light guide further includes a lens or a refraction pattern configured to guide the another part of the light emitted from the light source.

16. The electronic device of claim 14, wherein the second light guide portion has a ring shape extending along a perimeter of the first light incident area.

\* \* \* \* \*